(12) United States Patent  
Qi et al.

(10) Patent No.: US 10,318,366 B2  
(45) Date of Patent: Jun. 11, 2019

(54) SYSTEM AND METHOD FOR RELATIONSHIP BASED ROOT CAUSE RECOMMENDATION

(71) Applicant: INTERNATIONAL BUSINESS MACHINES CORPORATION, Armonk, NY (US)

(72) Inventors: Yao Dong Qi, Beijing (CN); Lan Jun Wang, Beijing (CN); Hai Shan Wu, Beijing (CN); Di Dx Xu, Beijing (CN); Yi Bj Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 342 days.

(21) Appl. No.: 14/845,667

(22) Filed: Sep. 4, 2015

(65) Prior Publication Data

US 2017/0068581 A1 Mar. 9, 2017

(51) Int. Cl.
*G06F 11/00* (2006.01)
*G06F 11/07* (2006.01)
*H04L 12/24* (2006.01)

(52) U.S. Cl.
CPC ........ *G06F 11/079* (2013.01); *G06F 11/0709* (2013.01); *H04L 41/00* (2013.01)

(58) Field of Classification Search
CPC .......................... G06F 11/079; G06F 11/3072; G06F 11/321; G06F 2201/86; G06F 11/0793; G06F 11/3006; G06F 21/566; H04L 41/0631; H04L 41/0677; H04L 41/12;

(Continued)

(56) References Cited

U.S. PATENT DOCUMENTS 6,363,477 B1 * 3/2002 Fletcher ............... H04L 43/106  
709/223  
6,442,615 B1 * 8/2002 Nordenstam ......... H04L 41/142  
709/223

(Continued)

FOREIGN PATENT DOCUMENTS

WO 2012092256 7/2012  
WO 2014088559 6/2014

OTHER PUBLICATIONS

Myunghwan Kim et al., "Root Cause Detection in a Service-Oriented Architecture", SIGMETRICS' 13, Jun. 17-21, Pittsburgh, PA, USA.

(Continued)

*Primary Examiner* — Loan L. T. Truong  
(74) *Attorney, Agent, or Firm* — F. Chau & Associates, LLC

(57) ABSTRACT

A method of identifying a root cause in a distributed computing environment includes traversing a plurality of nodes in a call graph starting with an end user node. Each node corresponds to an application component. A response time is calculated between connected pairs of neighboring nodes. A weight is calculated for each of a plurality of edges connecting the neighboring nodes. The nodes are traversed starting with the end user node in an order based on the weight of each of the edges. A root cause score is calculated for each node based on traversing all of the nodes in the order based on the weight of each of the edges. A ranked list is generated.

15 Claims, 19 Drawing Sheets

(58) Field of Classification Search
CPC .............. H04L 45/125; H04L 12/1868; H04L 41/5096; H04L 45/12

See application file for complete search history.

(56) References Cited

U.S. PATENT DOCUMENTS

| | | | |
|---|---|---|---|
| 6,707,795 B1* | 3/2004 | Noorhosseini | H04L 41/0631 370/242 |
| 7,206,972 B2* | 4/2007 | Wilson | H04L 41/00 714/31 |
| 7,239,677 B2* | 7/2007 | Jonsson | H04B 1/712 375/343 |
| 7,506,195 B2* | 3/2009 | Takahashi | G06F 11/0709 707/999.202 |
| 7,580,998 B2* | 8/2009 | Scarth | H04L 41/065 370/241 |
| 7,593,936 B2* | 9/2009 | Hooks | G06F 11/0748 |
| 7,818,418 B2 | 10/2010 | Bansal et al. | |
| 7,940,716 B2* | 5/2011 | Twitchell, Jr. | H04W 40/12 370/328 |
| 8,001,527 B1 | 8/2011 | Qureshi et al. | |
| 8,023,867 B2 | 9/2011 | Takano et al. | |
| 8,032,867 B2 | 10/2011 | Bansal | |
| 8,225,291 B2* | 7/2012 | Chung | G06F 11/3419 714/38.1 |
| 8,375,370 B2 | 2/2013 | Chaar et al. | |
| 8,423,827 B2* | 4/2013 | Berriss | G06F 11/0709 370/229 |
| 8,463,899 B2* | 6/2013 | Scarpelli | G06F 11/0709 709/224 |
| 8,553,561 B1* | 10/2013 | Chokshi | H04L 45/125 370/238 |
| 8,751,867 B2 | 6/2014 | Marvasti et al. | |
| 9,065,743 B2* | 6/2015 | Bakshi | H04L 41/12 |
| 9,160,609 B2* | 10/2015 | Dunbar | H04L 12/4625 |
| 9,160,628 B2* | 10/2015 | Field | H04L 12/1868 |
| 9,418,088 B1 | 8/2016 | Noll | H04L 43/00 |
| 9,537,720 B1 | 1/2017 | Baggott | H04L 41/12 |
| 9,882,782 B2* | 1/2018 | Finkler | H04L 41/12 |
| 9,954,765 B2* | 4/2018 | Allan | H04L 45/12 |
| 2001/0052016 A1* | 12/2001 | Skene | G06F 9/505 709/226 |
| 2002/0111755 A1* | 8/2002 | Valadarsky | H04L 41/0604 702/58 |
| 2003/0046390 A1* | 3/2003 | Ball | H04L 41/12 709/224 |
| 2004/0073844 A1* | 4/2004 | Unkle | G05B 23/0229 714/39 |
| 2004/0218698 A1* | 11/2004 | Jonsson | H04B 1/712 375/343 |
| 2005/0144314 A1* | 6/2005 | Kan | H04L 43/18 709/238 |
| 2005/0206513 A1* | 9/2005 | Fallon | G08B 25/012 340/506 |
| 2006/0007863 A1* | 1/2006 | Naghian | H04L 45/26 370/238 |
| 2008/0037562 A1* | 2/2008 | Saleh | H04L 12/66 370/400 |
| 2008/0114581 A1* | 5/2008 | Meir | H04L 12/66 703/13 |
| 2008/0222068 A1* | 9/2008 | Bahl | G06N 5/043 706/46 |
| 2008/0279101 A1* | 11/2008 | Wu | H04L 45/123 370/235 |
| 2009/0086741 A1* | 4/2009 | Zhang | H04L 41/5009 370/401 |
| 2010/0138694 A1* | 6/2010 | Harrison | G06F 11/0739 714/26 |
| 2010/0306305 A1* | 12/2010 | DeHaan | H04L 41/0853 709/203 |
| 2011/0047262 A1* | 2/2011 | Martin | H04L 41/064 709/224 |
| 2012/0158933 A1* | 6/2012 | Shetty | H04L 41/12 709/223 |
| 2012/0185735 A1* | 7/2012 | Sambamurthy | G06F 11/079 714/47.1 |
| 2012/0300774 A1* | 11/2012 | Casey | H04L 12/462 370/390 |
| 2012/0331551 A1* | 12/2012 | van Steenbergen | H04L 45/02 726/22 |
| 2013/0097463 A1 | 4/2013 | Marvasti et al. | |
| 2013/0117748 A1* | 5/2013 | Cooper | G06F 9/54 718/100 |
| 2013/0212440 A1* | 8/2013 | Rom | G06F 11/0709 714/47.1 |
| 2015/0188783 A1* | 7/2015 | Shivashankar | G06Q 30/0241 709/224 |
| 2016/0036725 A1* | 2/2016 | Syed | H04L 67/10 709/226 |
| 2016/0149771 A1* | 5/2016 | Prasad | H04L 41/5054 709/226 |
| 2016/0162346 A1* | 6/2016 | Kushnir | G06F 11/079 714/37 |
| 2016/0180093 A1* | 6/2016 | Goss | G06F 21/57 726/1 |
| 2016/0224400 A1* | 8/2016 | Shafique | G06F 11/079 |
| 2017/0075744 A1* | 3/2017 | Deshpande | G06F 11/079 |
| 2017/0093645 A1* | 3/2017 | Zhong | G06F 3/0482 |
| 2017/0155570 A1* | 6/2017 | Maheshwari | H04L 43/50 |
| 2017/0161131 A1* | 6/2017 | Noll | G06F 11/079 |
| 2017/0284839 A1* | 10/2017 | Ojala | H04L 67/12 |
| 2018/0197327 A1* | 7/2018 | Sun | G06T 15/506 |

OTHER PUBLICATIONS

Mazda A. Marvasti, et al., "An Anomaly Event Correlation Engine: Identifying Root Causes, Bottlenecks, and Black Swans in it Environements", VMware Technical Journal, 2013, pp. 1-34.

Office Action dated Dec. 1, 2017, in U.S. Appl. No. 14/845,729.

Final Office Action issued in corresponding U.S. Appl. No. 14/845,729, dated Jun. 4, 2018.

* cited by examiner

SYSTEM AND METHOD FOR RELATIONSHIP BASED ROOT CAUSE RECOMMENDATION

BACKGROUND

Exemplary embodiments of the present invention relate to root cause recommendation. More particularly, exemplary embodiments of the present invention relate to a system and method for relationship based root cause recommendation.

Computer systems, such as cloud applications, may include a distributed computing environment. Cloud applications may include a distributed dynamic environment with linked computers and servers existing in a number of geographic locations. Application problems or errors may occur at any number of the linked computers and servers. Thus, monitoring cloud applications for desired functioning may include identifying one or more root causes of problems or errors. For example, a single server in a particular geographic location may have a problem or error which may impact other servers linked to the server having the problem or error. However, in a large-scale distributed dynamic environment, a relatively large number of errors or problems may be detected. Thus, it may be difficult to identify a particular server that is demonstrating abnormal behavior and it may be difficult to prioritize individual servers or computers for maintenance or repair. Generally, identifying the root cause of a problem in a large-scale distributed dynamic environment will reduce the time elapsed between an occurrence of a problem or error and the resolution of the problem or error.

SUMMARY

Exemplary embodiments of the present invention provide a method of identifying a root cause in a distributed computing environment including traversing a plurality of nodes in a call graph starting with an end user node. Each node corresponds to an application component in the distributed computing environment. A response time is calculated between pairs of neighboring nodes from among the plurality of nodes. The neighboring nodes in each pair are connected to each other in the call graph. A weight is calculated for each of a plurality of edges connecting the neighboring nodes in the pairs. All of the nodes in the call graph are traversed starting with the end user node in an order based on the weight of each of the plurality of edges. A root cause score is calculated for each node in the call graph based on traversing all of the nodes in the call graph in the order based on the weight of each of the plurality of edges. A ranked list is generated including all of the nodes in an order based on the root cause score of each node.

According to an exemplary embodiment of the present invention the method of identifying a root cause in a distributed computing environment may include generating a recommendation comprising the first node in the ranked list. The first node may be the root cause identified in the distributed computing environment.

According to an exemplary embodiment of the present invention the first node in the ranked list may correspond to an application component that acts as a system bottleneck in the distributed computing environment.

According to an exemplary embodiment of the present invention the weight of each edge may be calculated based on a correlation between (i) the response time between the neighboring nodes in the corresponding pair and (ii) a response time between the neighboring node furthest from the end user node and the end user node.

According to an exemplary embodiment of the present invention the application components may be computer servers.

According to an exemplary embodiment of the present invention the order in which all of the nodes in the call graph are traversed may be a highest weight to lowest weight order.

According to an exemplary embodiment of the present invention the order in which all of the nodes in the call graph are traversed may be a lowest weight to highest weight order.

According to an exemplary embodiment of the present invention the method of identifying a root cause in a distributed computing environment may include detecting similar abnormal patterns that occur while traversing all of the nodes in the call graph starting with the end user node in the order based on the weight of each of the plurality of edges.

Exemplary embodiments of the present invention provide a method of identifying a root cause in a distributed computing environment including traversing a plurality of nodes in a call graph starting with an end user node. Each node corresponds to an application component in the distributed computing environment. A throughput is calculated between pairs of neighboring nodes from among the plurality of nodes. The neighboring nodes in each pair are connected to each other in the call graph. A weight is calculated for each of a plurality of edges connecting the neighboring nodes in the pairs. All of the nodes in the call graph are traversed starting with the end user node in an order based on the weight of each of the plurality of edges. A root cause score is calculated for each node in the call graph based on traversing all of the nodes in the call graph in the order based on the weight of each of the plurality of edges. A ranked list is generated including all of the nodes in an order based on the root cause score of each node.

Exemplary embodiments of the present invention provide a method of identifying a root cause in a distributed computing environment including traversing a plurality of nodes in a call graph starting with an end user node. Each node corresponds to an application component in the distributed computing environment. A packet loss rate is calculated between pairs of neighboring nodes from among the plurality of nodes. The neighboring nodes in each pair are connected to each other in the call graph. A weight is calculated for each of a plurality of edges connecting the neighboring nodes in the pairs. All of the nodes in the call graph are traversed starting with the end user node in an order based on the weight of each of the plurality of edges. A root cause score is calculated for each node in the call graph based on traversing all of the nodes in the call graph in the order based on the weight of each of the plurality of edges. A ranked list is generated including all of the nodes in an order based on the root cause score of each node.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION

Figure 1:
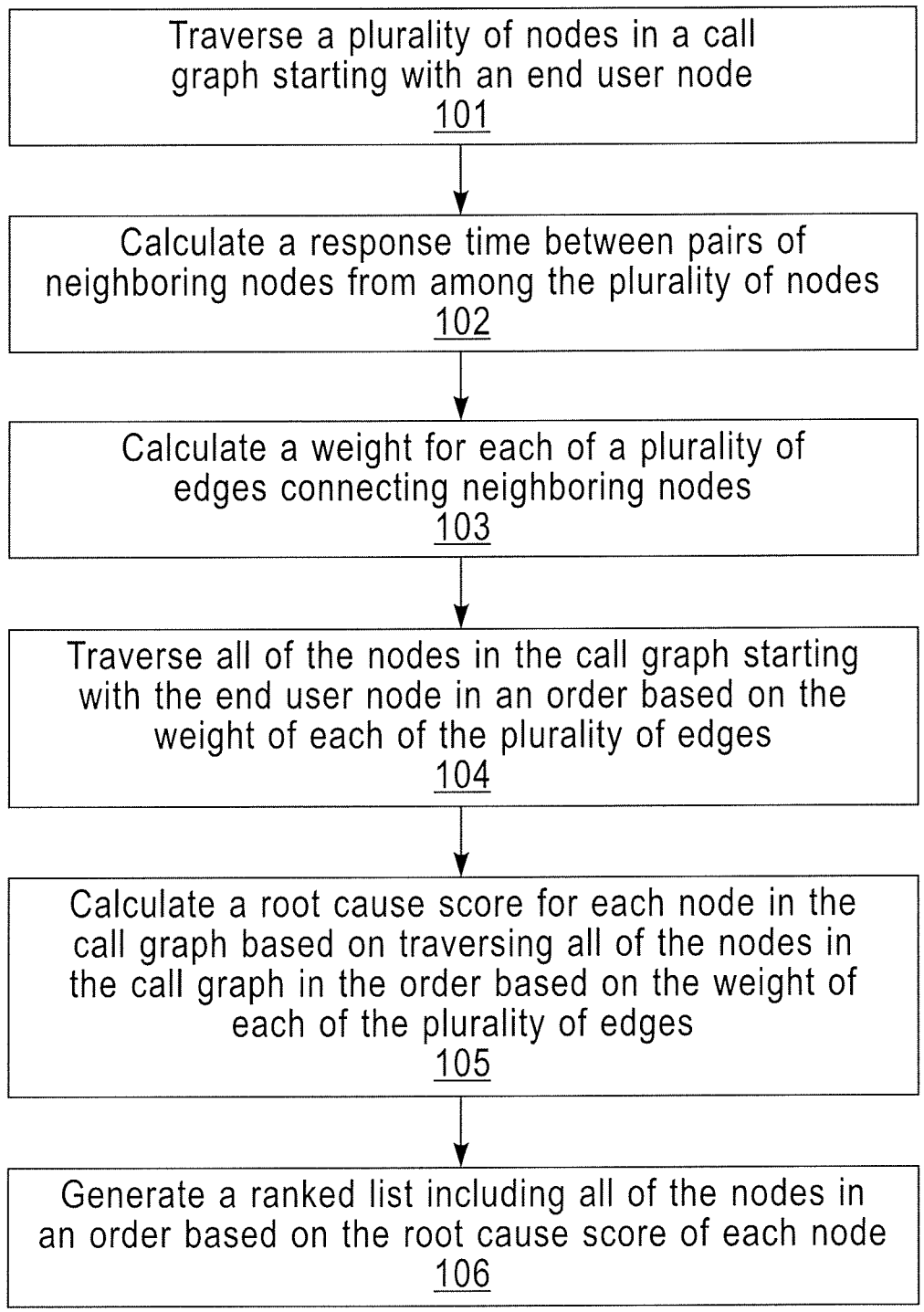
FIG. 1 is a flow chart of a method of relationship based root cause recommendation according to exemplary embodiments of the present invention.

Exemplary embodiments of the present invention described herein generally include identifying a root cause in a distributed computing environment. Accordingly, while the exemplary embodiments of the present invention may be susceptible to various modifications and alternative forms, specific exemplary embodiments are shown by way of example in the drawings and will herein be described in more detail. It should be understood, however, that there is no intent to limit the disclosure to the particular forms disclosed, but on the contrary, the disclosure is to cover all modifications, equivalents, and alternatives falling within the spirit and scope of the present invention.

Exemplary embodiments of the present invention will be described more fully hereinafter with reference to the accompanying drawings. Like reference numerals may refer to like elements throughout the specification and drawings.

FIG. 1 is a flow chart of a method of relationship based root cause recommendation according to exemplary embodiments of the present invention.

Exemplary embodiments of the present invention provide a method of identifying a root cause in a distributed computing environment. Referring to FIG. 1, the method of identifying a root cause in a distributed computing environment may include traversing a plurality of nodes in a call graph starting with an end user node 101. Each node may correspond to an application component in the distributed computing environment. A response time may be calculated between pairs of neighboring nodes from among the plurality of nodes 102. The neighboring nodes in each pair may be connected to each other in the call graph. A weight may be calculated for each of a plurality of edges connecting the neighboring nodes in the pairs 103. All of the nodes in the call graph may be traversed starting with the end user node in an order based on the weight of each of the plurality of edges 104. A root cause score may be calculated for each node in the call graph based on traversing all of the nodes in the call graph in the order based on the weight of each of the plurality of edges 105. A ranked list may be generated including all of the nodes in an order based on the root cause score of each node 106. A node having a highest root cause score may be a first node in the ranked list and a node having a lowest root cause score may be a last node in the ranked list.

Figure 2:
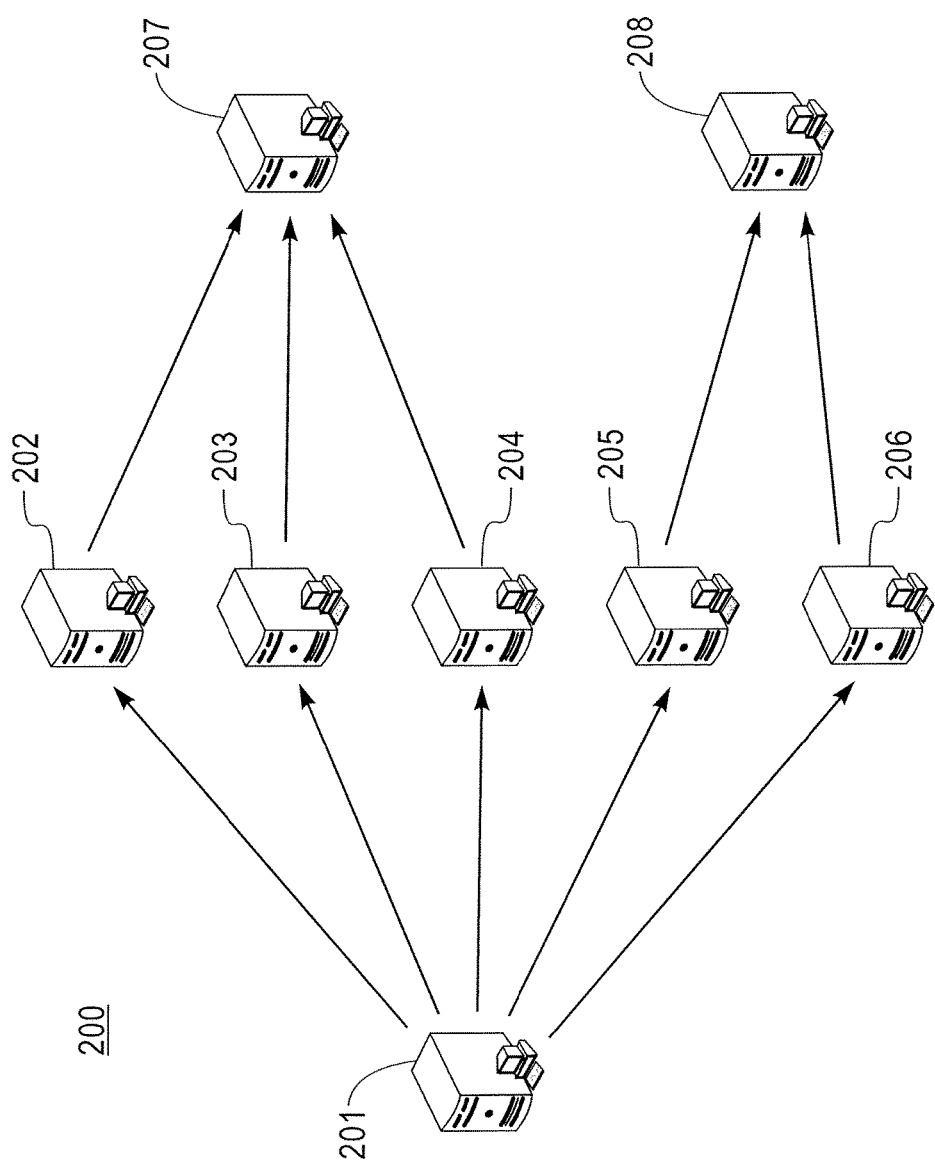
FIG. 2 illustrates a distributed computing environment according to an exemplary embodiment of the present invention.

FIG. 2 illustrates a distributed computing environment according to an exemplary embodiment of the present invention.

Referring to FIG. 2, a distributed computing environment 200 may include a plurality of servers or computers (e.g., servers 201, 202, 203, 204, 205, 206, 207 and 208). The terms server, node and computer may be used interchangeably herein. Each server or computer in the distributed computing environment may be used to execute an application, such as a cloud application, and thus, each server, node or computer may be referred to as an application component. For example, as described below in more detail, a graph of the plurality of servers (e.g., servers 201, 202, 203, 204, 205, 206, 207 and 208) may include a plurality of nodes, and each of the plurality of nodes may represent a server.

According to exemplary embodiments of the present invention, each of the plurality of servers (e.g., servers 201, 202, 203, 204, 205, 206, 207 and 208) may be linked with or may communicate with at least one other server. For example, as illustrated in FIG. 2, server 201 may be linked with servers 202, 203, 204, 205 and 206, while servers 202, 203 and 204 are linked with server 207, and servers 205 and 206 are linked with server 208. Communication between each of the servers may be unidirectional or bidirectional, as desired.

Each of the servers (e.g., servers 201, 202, 203, 204, 205, 206, 207 and 208) of the distributed computing environment may be disposed in a different geographic location. For example, each of the servers (e.g., servers 201, 202, 203, 204, 205, 206, 207 and 208) of the distributed computing environment may be disposed in different countries or regions from each other. Distances between each of the servers (e.g., servers 201, 202, 203, 204, 205, 206, 207 and 208) may vary. Alternatively, some or all of the servers (e.g., servers 201, 202, 203, 204, 205, 206, 207 and 208) may be disposed in a same geographic location.

Figure 3:
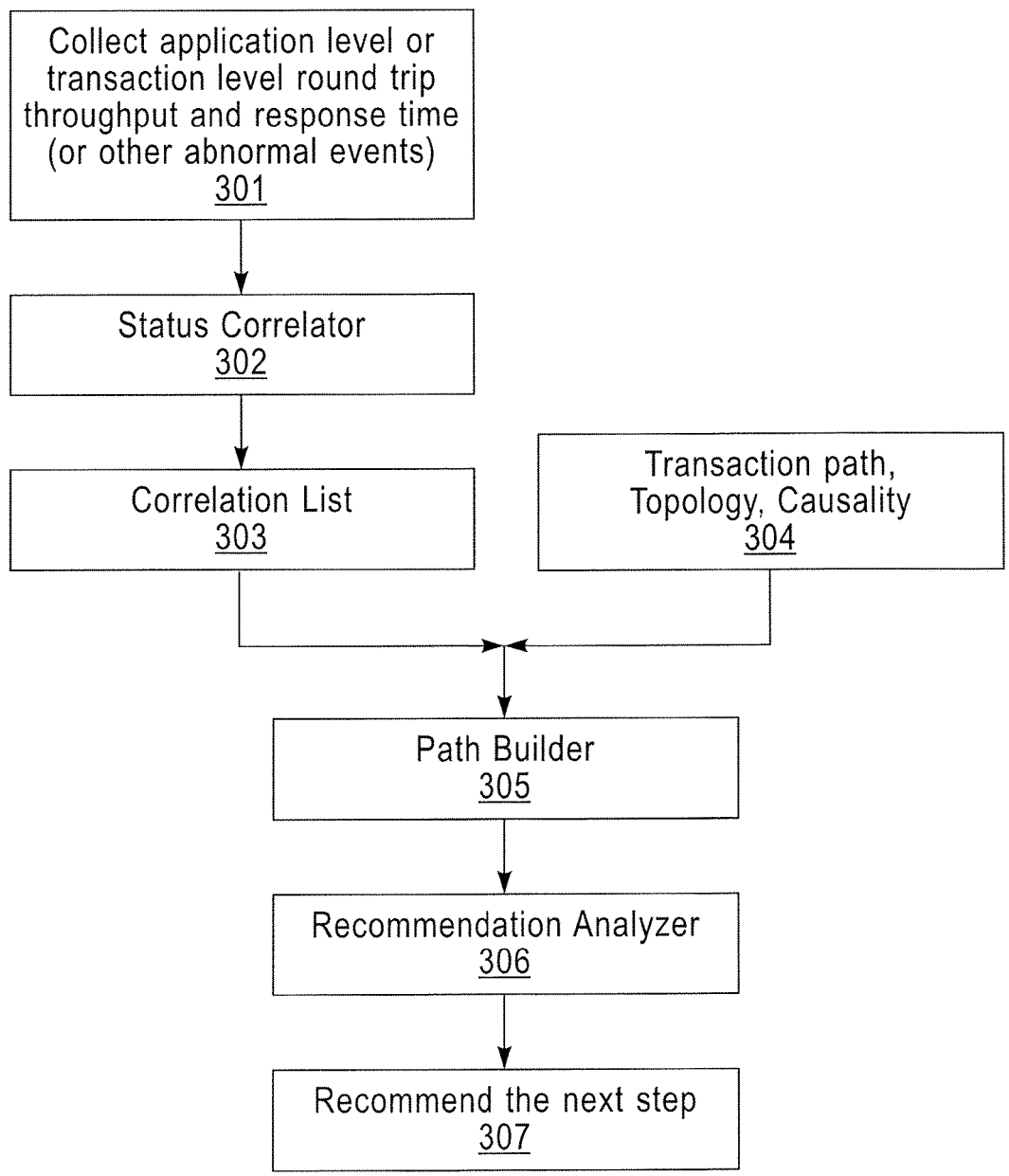
FIG. 3 is a schematic diagram illustrating a method of relationship based root cause recommendation according to an exemplary embodiment of the present invention.

FIG. 3 is a schematic diagram illustrating a method of relationship based root cause recommendation according to an exemplary embodiment of the present invention.

Referring to FIG. 3 a method of relationship based root cause recommendation according to exemplary embodiments of the present invention may include collecting application level and/or transaction level round trip throughput and response time and/or abnormal events 302. Abnormal events may be detected at any of the nodes or components in the distributed computing environment. An abnormal event may be a delayed response time or latency at a particular node. The terms latency and response time may be used interchangeably herein. Examples of delayed response times and delayed latencies are illustrated, for example, in FIG. 8, FIGS. 11A-B, FIG. 14 and FIG. 15 and are discussed in more detail below.

Application level response time may refer to the elapsed time for a signal to traverse through all application components. Transaction level response time may refer to the elapsed time for a signal to traverse through a predetermined number of application components that are needed to execute a transaction. For example, a user may request a particular service or task from the distributed computing environment, which may be referred to as a transaction. According to an exemplary embodiment of the present invention the application components may be services executed by a plurality of computers in the distributed computing environment. According to an exemplary embodiment of the present invention, the group of the application components used to execute the requested transaction may include some of the application components. Alternatively, the group of the application components used to execute the requested transaction may include all of the application components. The transaction may include communication between a predetermined number of servers of the distributed computing environment to deliver the user a response or result. Application level throughput may refer to the amount of data transmitted through the servers in the distributed computing environment. Transaction level throughput may refer to the amount of data transmitted through the servers needed to execute a particular transaction.

The collected application level or transaction level throughput and response time 301 may be evaluated by a status correlator 302. The status correlator 302 may correlate the component level metrics with the application level metrics. For example, the status correlator 302 may compare the throughput, response time or occurrence of abnormal events at a particular event to the throughout, response time and abnormal event occurrences of the entire application. Thus, the status correlator may generate a correlation list 303. The correlation list may include root cause scores for each of the components of the application. The correlation list may be provided to a path builder 305. The path builder may combine transaction path, topology and causality data 304, as discussed below in more detail with reference to FIG. 5. The path builder may provide path or graphical data to a recommendation analyzer 306 and the recommendation analyzer 306 may recommend a next step 307 to an end user. The recommendation analyzer is discussed in more detail below with reference to FIG. 4. The path builder 305 and the recommendation analyzer 306 illustrated in FIG. 3 may be substantially the same as the path builder and recommendation analyzer described with reference to FIG. 4, FIG. 5, FIGS. 6A-C and FIGS. 8-10.

The status correlator 302 may apply a Pearson's correlation coefficient to determine a root cause score for each of the nodes, however, exemplary embodiments of the present invention are not limited thereto and any correlation analysis may be performed, as desired. For example, the Pearson's correlation coefficient may calculate the correlation between two series (e.g., X and Y) and may be presented by:

$$\text{corr}(X, Y) = \left| \frac{E[(X - \mu_x)Y - \mu_Y)]}{\sigma_X \sigma_Y} \right|$$

E may be the expected value operator, $\mu_x$ and $\mu_y$ may be the expected values, $\delta_x$ and $\delta_y$ may be the standard deviations.

X may be applied as the throughput of a system component, and Y may be the throughput of the entire application. The result is 1 in the case of a perfect linear correlation. As the result approaches zero, the two values may be closer to uncorrelated. The root cause score may be determined by comparing the result of the above correlation coefficient with the overall application anomaly.

Figure 4:
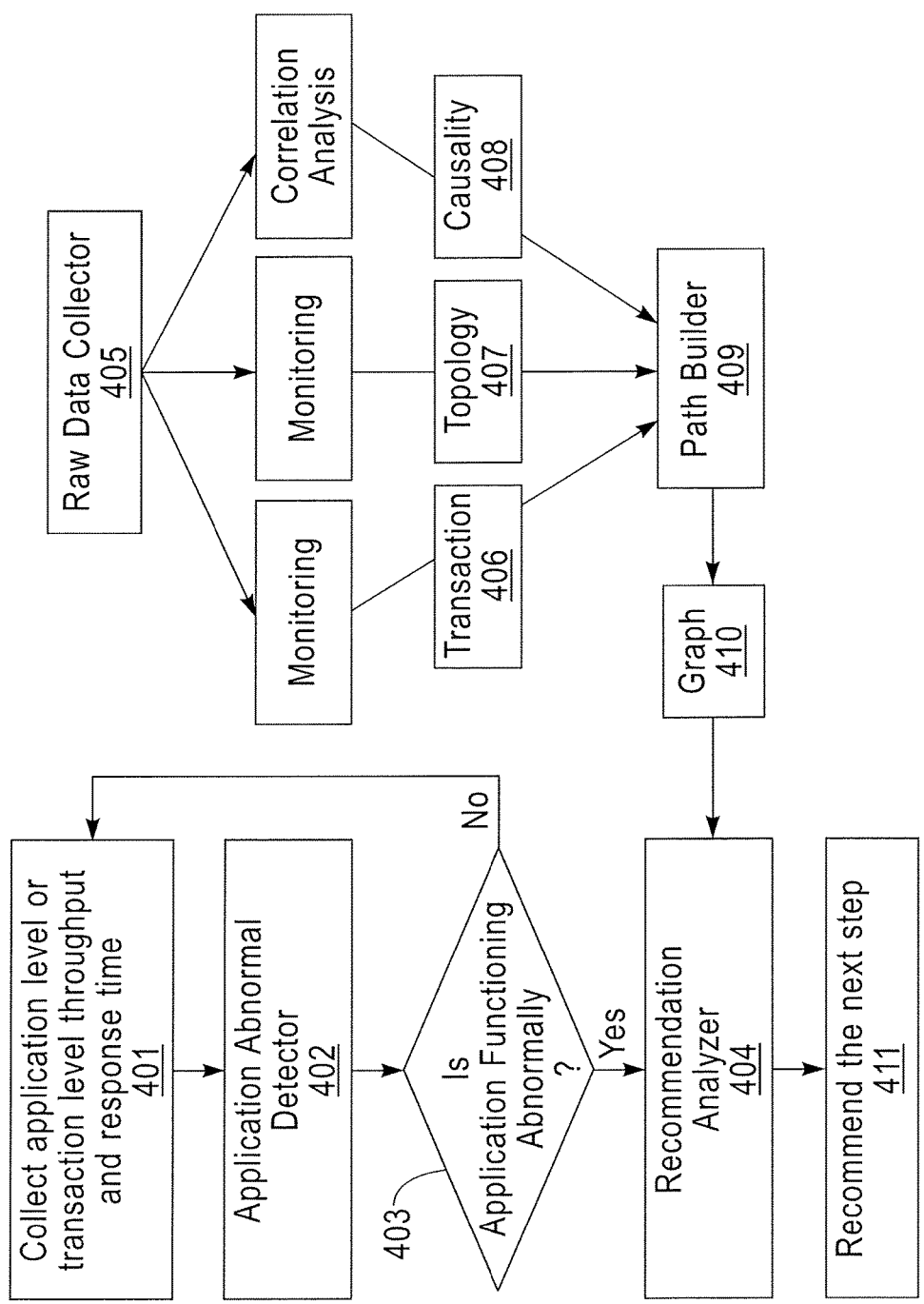
FIG. 4 is a schematic diagram illustrating a method of relationship based root cause recommendation according to an exemplary embodiment of the present invention.

FIG. 4 is a schematic diagram illustrating a method of relationship based root cause recommendation according to exemplary embodiments of the present invention.

Referring to FIG. 4, a method of relationship based root cause recommendation according to exemplary embodiments of the present invention may include collecting application level and/or transaction level throughput and response time 401. Application level response time may refer to the elapsed time for a signal to traverse through all application components. Transaction level response time may refer to the elapsed time for a signal to traverse through a predetermined number of application components that are needed to execute a transaction. For example, a user may request a particular service or task from the distributed computing environment, which may be referred to as a transaction. According to an exemplary embodiment of the present invention the application components may be services executed by a plurality of computers in the distributed computing environment. According to an exemplary embodiment of the present invention the group of the application components used to execute the requested transaction may include some of the application components. Alternatively, the group of the application components used to execute the requested transaction may include all of the application components. The transaction may include communication between a predetermined number of servers of the distributed computing environment to deliver the user a response or result. Application level throughput may refer to the amount of data transmitted through the servers in the distributed computing environment. Transaction level throughput may refer to the amount of data transmitted through the servers needed to execute a particular transaction.

The collected application level or transaction level throughput and response time 401 may be evaluated by an application abnormal detector 402. The application abnormal detector 402 may determine if an application is functioning normally. For example, the application abnormal detector 402 may determine whether one or more components of the application are functioning normally or abnormally 403. If the application is found to be functioning normally then a new collection of application level or transaction level throughput and response time 401 may be determined. This process may be repeatedly performed, as desired. For example the process may be performed according to predetermined time intervals or a predetermined number (e.g., 2,500) of processes may be performed to detect application abnormalities, as desired. According to an exemplary embodiment of the present invention the presence of at least one abnormal application component may function as a system bottleneck. If an abnormality is detected, the collected throughput and/or response times may be evaluated by a recommendation analyzer 404, which may recommend a next step 411 to a user.

According to an exemplary embodiment of the present invention, the application abnormal detector 402 may be a threshold abnormality detector. For example, the application abnormal detector 402 may detect an abnormality when a throughput is below a predetermined threshold or when a response time is above a predetermined threshold. If an abnormality is detected, the collected throughput and response times may be evaluated by the recommendation analyzer 404, which may recommend a next step 411 to a user.

The recommendation analyzer 404 may receive a graph 410 from a path builder 409. The path builder 409 may build a graphical representation (e.g., the graph 310) of each of the components of the application. The path builder 409 may receive transaction data 406, topology data 407 and correlation analysis (causality) data 408 from a raw data collector 405 that monitors each of these types of data. The path builder may combine the transaction data 406, the topology data 407 and the correlation analysis (causality) data 408 from the raw data collector 405 to form the graph 310 and may provide the graph to the recommendation analyzer 404. The path builder 409 will be described in more detail below with reference to FIG. 5. The graph generated by the path builder 409 will be described in more detail below with reference to FIGS. 6A, 6B, 6C and 8.

Figure 5:
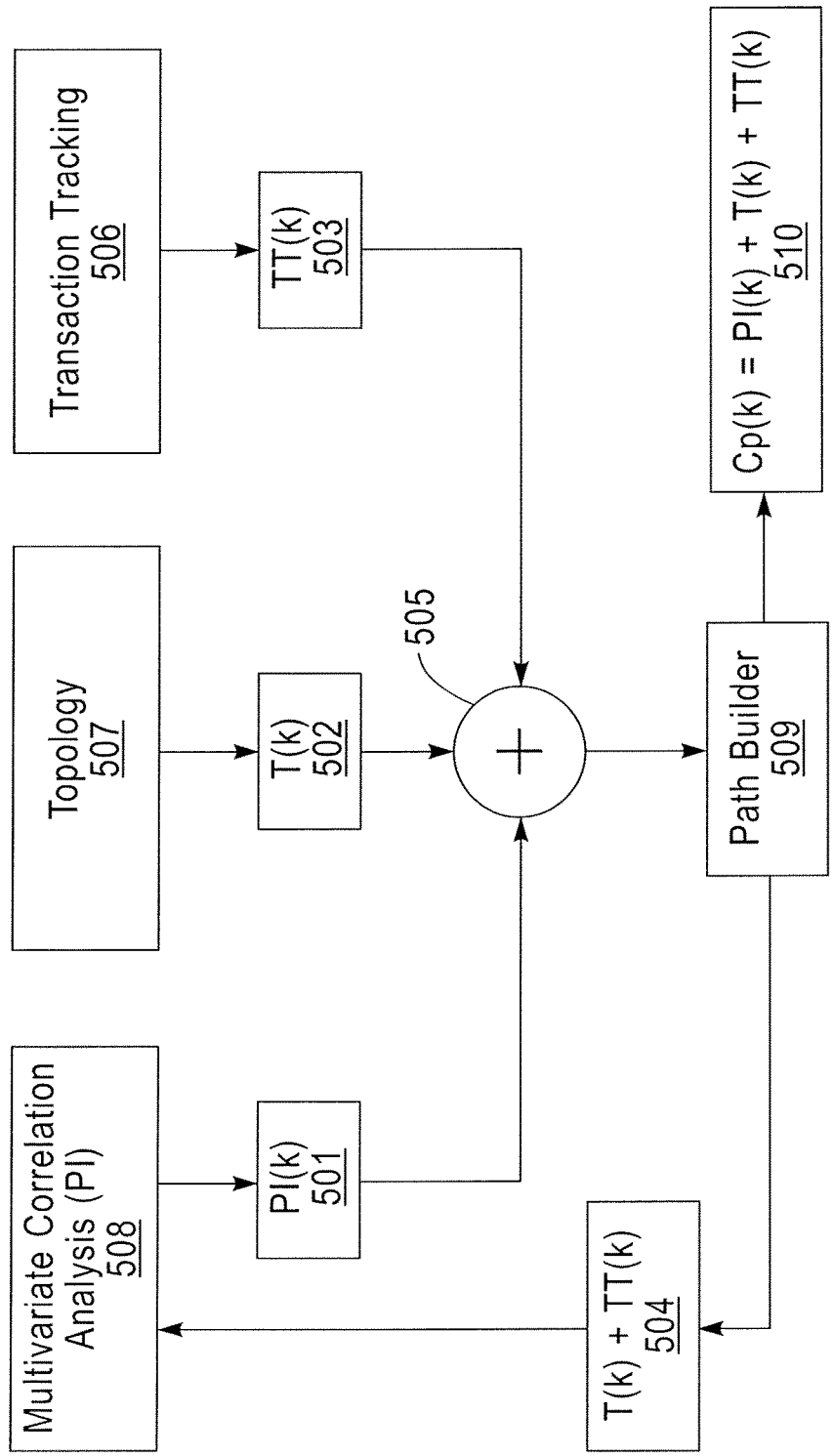
FIG. 5 is a schematic diagram illustrating a path builder according to an exemplary embodiment of the present invention.

FIG. 5 is a schematic diagram illustrating a path builder according to an exemplary embodiment of the present invention.

Referring to FIG. 5, the path builder 509 may generate a graph based on dependency relationships between the components of the application (see, e.g., FIG. 6 illustrating an exemplary graph including the plurality of nodes representing the plurality of components). The graph generated by the path builder 509 may include topology data and transaction tracking data between the components. That is, the generated graph may be representative of the spatial relationship between individual application components (e.g., based on the topology data), the communications/interconnectivity between individual application components when executing a transaction (e.g., based on the transaction tracking data), and the distances between individual application components (e.g., based on the topology data). As described below in more detail, the generated graph may be traversed at least one time to generate throughput and/or response time data between individual application components. For example, the graph may be repeatedly traversed, as desired. For example, the graph may be repeatedly traversed according to predetermined time intervals, or a predetermined number (e.g., 2,500) of traversals may be performed to detect and/or determine a location of application abnormalities.

The path builder may receive topology relationship data 507 (T(k) 502), transaction tracking relationship data 506 (TT(k) 503) and metric correlation relationship data 508 (PI(k) 501). The path builder 509 may provide combined topology and transaction tracking data (T(k)+TT(k) 504 for multivariate correlation analysis 508. The topology relationship data 507 (T(k) 502), the transaction tracking relationship data 506 (TT(k) 503) and the metric correlation relationship data 508 (PI(k) 501) may be combined 505 by the path builder 509 to generate the graph. That is, the generated graph may include the combined topology relationship data 507 (T(k) 502), transaction tracking relationship data 506 (TT(k) 503) and metric correlation relationship data 508 (PI(k) 501), which may be represented by formula Cp(k)=PI(k)+T(k)+TT(k) 510. The topology relationship data 507 (T(k) 502), the transaction tracking relationship data 506 (TT(k) 503) and the metric correlation relationship data 508 (PI(k) 501) will be described in more detail below.

According to an exemplary embodiment of the present invention the transaction tracking relationship data 506 may indicate a traversed path along the group of the application components taken to execute the requested transaction. The topology relationship data 507 may indicate the spatial relationship between application components (e.g., the physical distance between geographic components).

Figure 6A:
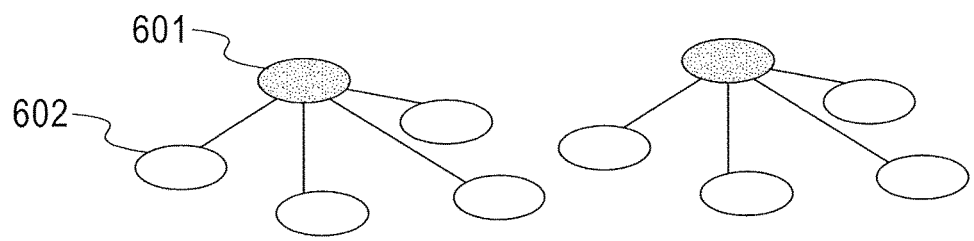
FIG. 6A illustrates topology relationship data according to an exemplary embodiment of the present invention.
Figure 6B:
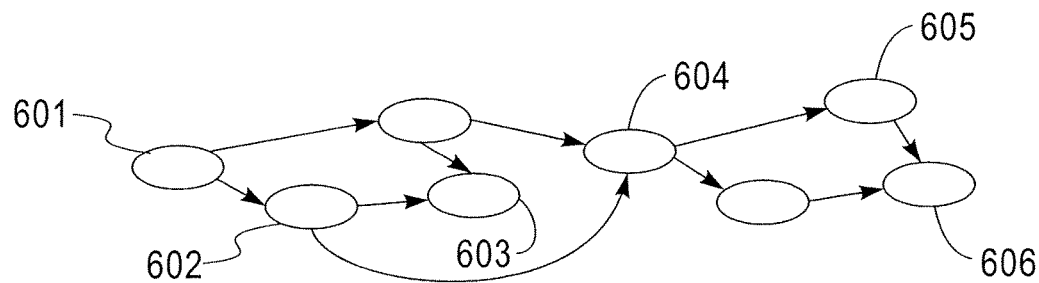
FIG. 6B illustrates transaction tracking relationship data according to an exemplary embodiment of the present invention.
Figure 6C:
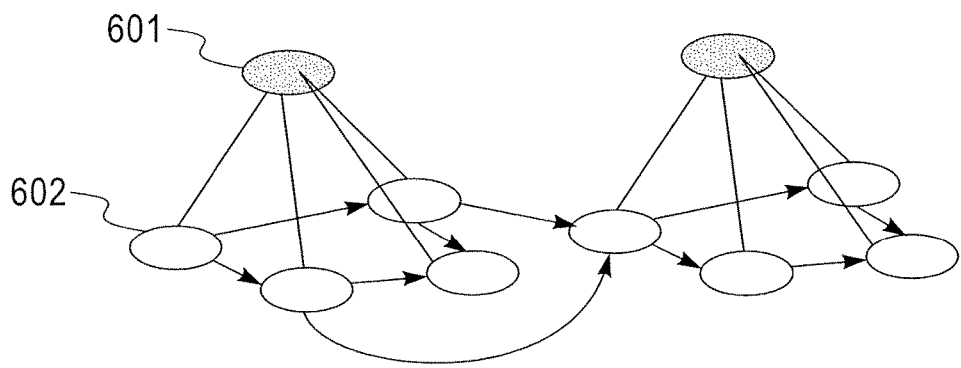
FIG. 6C illustrates metric correlation relationship data according to an exemplary embodiment of the present invention.

FIG. 6A illustrates topology relationship data according to an exemplary embodiment of the present invention. FIG. 6B illustrates transaction tracking relationship data according to an exemplary embodiment of the present invention. FIG. 6C illustrates metric correlation relationship data according to an exemplary embodiment of the present invention.

Referring to FIG. 6A, the topology relationship data may be representative of the spatial relationship between individual application components or nodes. For example, the individual application components may be represented by nodes 601 and 602, as well as the additional nodes shown in FIG. 6A. The topology relationship data may be representative of the relative distances between individual application components (e.g., the distances between application components located at a same and/or at different geographic locations).

Referring to FIG. 6B, the transaction tracking relationship data may be representative of the communications/interconnectivity between individual application components (e.g., nodes 601 through 606, as well as the additional nodes shown in FIG. 5B) that are needed to execute a transaction. When executing a specific transaction, some of the nodes may communicate with each other, while other nodes might not communicate with each other. That is, different transactions may need different groups of nodes to be executed. For example, a first transaction may need communication to occur between nodes 601, 602 and 603, while a second transaction may need communication to occur between nodes 601, 602, 604, 605 and 606.

Referring to FIG. 6C, the topology relationship data and the transaction tracking relationship data may be combined to generate metric correlation relationship data. The combined metric correlation relationship data will be described below in more detail with reference to FIG. 8.

Figure 7:
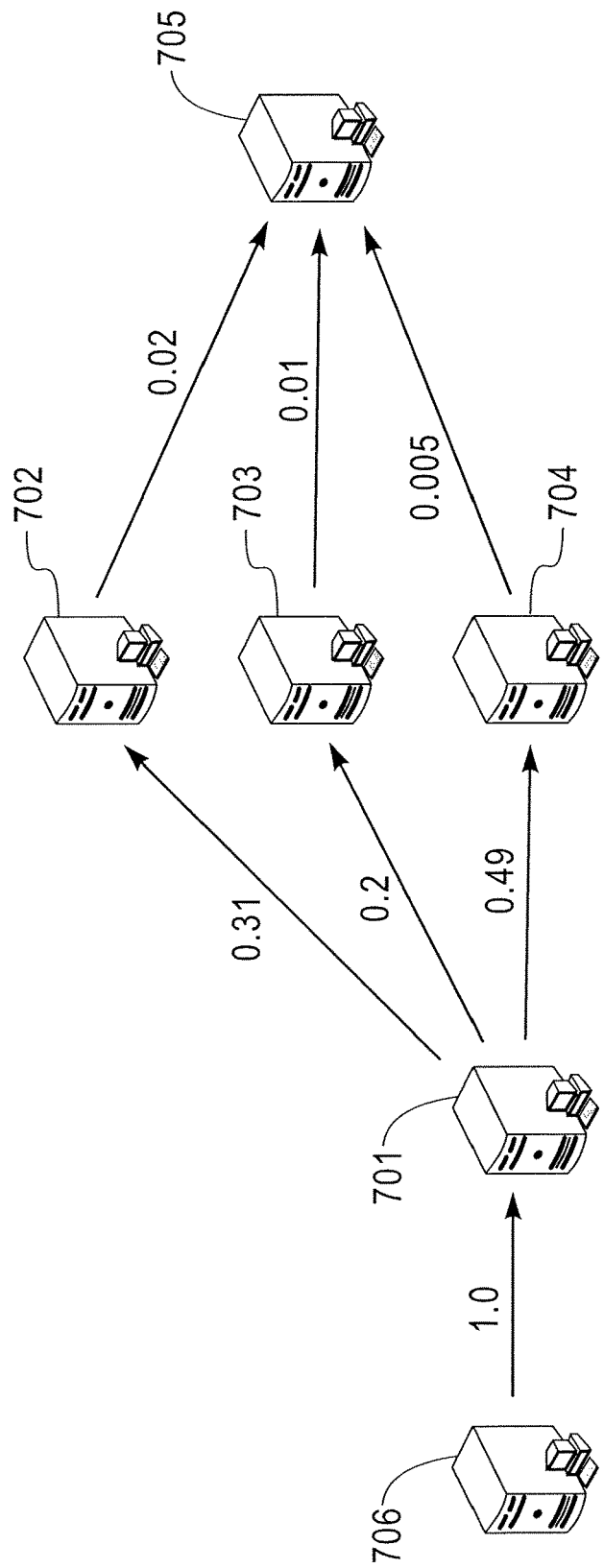
FIG. 7 illustrates exemplary weights for edges connecting neighboring nodes according to exemplary embodiments of the present invention.

FIG. 7 illustrates exemplary weights for edges connecting neighboring nodes according to exemplary embodiments of the present inventive concept.

Referring to FIG. 7, a distributed computing environment may include a plurality of servers or computers (e.g., servers 701, 702, 703, 704, 705 and 706). The terms server, node and computer may be used interchangeably herein. Node 706 may be an end user node. Each server or computer in the distributed computing environment may be used to execute an application, such as a cloud application, and thus, each server or computer may be referred to as an application component. Each component of the application may be referred to as a node. For example, as described below in more detail, a graph of the plurality of servers (e.g., servers 701, 702, 703, 704, 705 and 706) may include a plurality of nodes, and each of the plurality of nodes may represent a server. The graph of the plurality of servers may be a call graph.

According to exemplary embodiments of the present invention, each of the plurality of servers (e.g., servers 701, 702, 703, 704, 705 and 706) may be linked with or may communicate with at least one other server. The links or connections between servers may be referred to as edges. A confidence score or weight may be calculated for each edge. The weight may be determined according to the latency detected in a particular edge compared with the end user latency or the latency for the entire application. The terms latency and response time may be used interchangeably herein. Latency and response time may refer to the amount of time spent between sending an RPC request and receiving a response. The weights for each of the servers may be an indication of how likely a particular server contains an abnormality or is not functioning as desired. A relatively high weight may be detected for servers having a relatively high latency.

Weights may be determined by applying the following adjacency matrix:

$$A'_{ij} = \begin{cases} S_j & \text{if } e_{ij} \in E \\ \rho S_i & \text{if } e_{ji} \in E, e_{ij} \notin E \\ \max(0, S_i - \max_{K:e_{jk} \in E}) & j = i > 1 \end{cases}$$

A normalized adjacency matrix may be represented by the following formula:

$$P_{ij} = \frac{A'_{ij}}{\sum_j A'_{ij}}.$$

For example, as illustrated in FIG. 7, server 701 may be linked with servers 702, 703, and 704, while servers 702, 703 and 704 may be linked with server 205. Communication between each of the servers may be unidirectional or bidirectional, as desired. Weights may be determined for the edges between server 701 and servers 702, 703, and 704, respectively, and between servers 702, 703, and 704 and server 705, respectively.

The weights may be determined by randomly walking over each node of the application. Weights may be an indication of the probability that a downstream component of an application includes an abnormality. Weights may be determined by randomly walking over a transaction graph generated by the graph builder and described below in more detail with reference to FIG. 8, for example.

When traversing each of the plurality of nodes in an application, a determination may be made of which node to proceed to next when more than one node is connected to a current node. For example, when arriving at node 701 the next node traversed may be one of nodes 702, 703, or 704.

A determination of which node to proceed to may be performed randomly picking up the next node in the application. If the weights in each of the edges are identical then pickup of a next node in the application may be purely random. However, when weights are not identical, the probability that a next node is picked up may be proportional to its weight. That is, a node that has an abnormality and therefore has an edge with a relatively high weight may be less likely to be picked up for traversal. Thus, a low probability that a downstream node is picked up (e.g., a node having an edge with a relatively high weight) may be more likely to include an abnormality.

Weights in each of the edges may be used to proportionally determine a root cause score, discussed in more detail below with reference to FIGS. 14-17, for each of the components or nodes of the application. According to an exemplary embodiment of the present invention the weight of each edge may be calculated based on a correlation between the response time between the neighboring nodes in a corresponding pair and a response time between the neighboring node furthest from the end user node and the end user node.

According to an exemplary embodiment of the present invention the order in which all of the nodes are traversed may be a highest weight to lowest weight order. According to an exemplary embodiment of the present invention the order in which all of the nodes in the call graph are traversed may be a lowest weight to highest weight order.

According to an exemplary embodiment of the present invention the method of identifying a root cause in a distributed computing environment may include detecting similar abnormal patterns that occur while traversing all of the nodes in the call graph starting with the end user node in the order based on the weight of each of the plurality of edges.

Each of the servers (e.g., servers 701, 702, 703, 704, 705 and 706) of the distributed computing environment may be disposed in a different geographic location. For example, each of the servers (e.g., servers 701, 702, 703, 704, 705 and 706) of the distributed computing environment may be disposed in different countries or regions from each other. Distances between each of the servers (e.g., servers 701, 702, 703, 704, 705 and 706) may vary. Alternatively, some or all of the servers (e.g., servers 701, 702, 703, 704, 705 and 706) may be disposed in a same geographic location.

Figure 8:
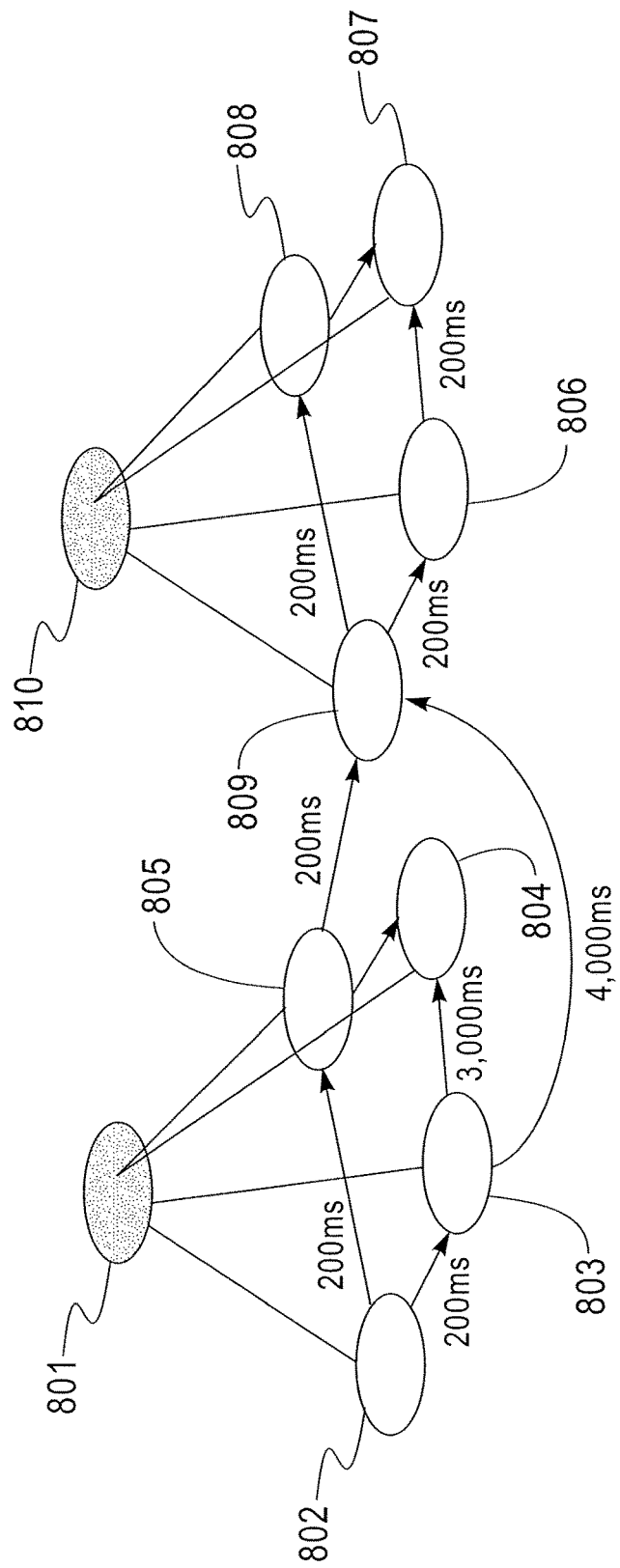
FIG. 8 illustrates an exemplary graph including a plurality of nodes corresponding to application components and node response times according to an exemplary embodiment of the present invention.

FIG. 8 illustrates an exemplary graph including a plurality of nodes corresponding to application components and node response times according to an exemplary embodiment of the present invention. The graph illustrated in FIG. 8 may be an example of the graph generated by the path builder described above.

Referring to FIG. 8, the graph generated may represent the combined metric correlation relationship data, and the graph may include metric data such as response time between each of the connected nodes corresponding to application components. The graph may be generated including a plurality of nodes corresponding to the application components by merging the metric correlation relationship data, the topology relationship data, and the transaction tracking relationship data. According to exemplary embodiments the metric data may include response time, throughput, latency and/or error count and may be represented on the graph generated by the path builder. For example, the generated graph may include nodes 801, 802, 803, 804, 805, 806, 807, 808, 809, 810 and response times between each of the connected nodes may be included in the graph. Target nodes may be identified among the plurality of nodes that correspond to application components having a response time that is above a predefined threshold. A plurality of paths along the graph that include the target nodes may be traversed to identify at least one node corresponding to an abnormal application component. A recommendation list may be generated including the at least one abnormal application component. According to an exemplary embodiment of the present invention the at least one node corresponding to the abnormal application component may be present in each of the traversed plurality of paths.

Referring to FIG. 8, nodes 804 and 809 may each be identified as having a relatively long response time. Thus, nodes 804 and 809 may be identified as corresponding to an abnormal application component and may be included in the recommendation list for service or repair.

Figure 9:
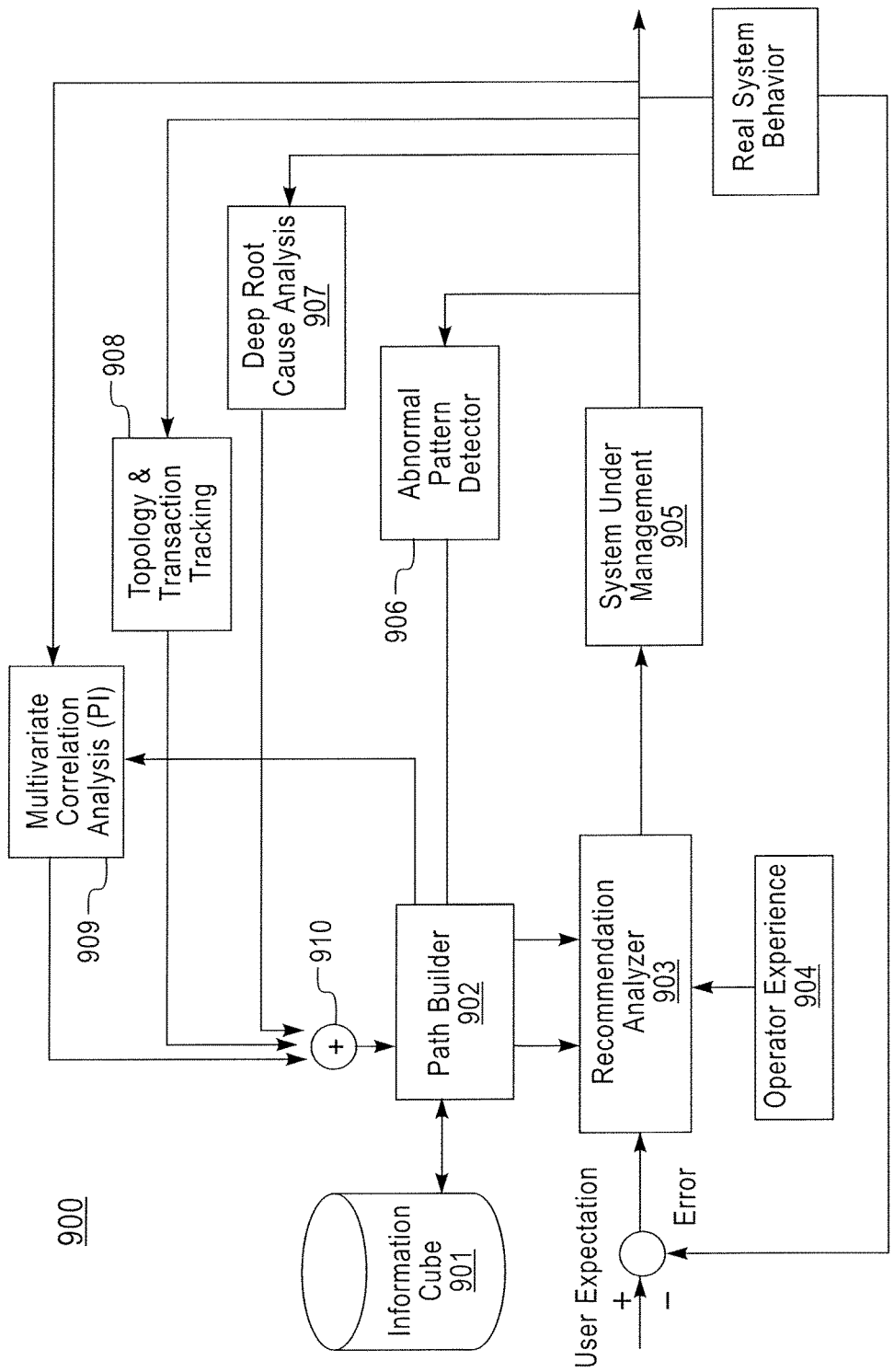
FIG. 9 is a schematic diagram illustrating root cause recommendation system architecture according to an exemplary embodiment of the present invention.

FIG. 9 is a schematic diagram illustrating root cause recommendation system architecture according to an exemplary embodiment of the present invention.

Referring to FIG. 9, a root cause recommendation system 900 may include an information cube 901, a path builder 902, a recommendation analyzer 903, a system under management 905, an abnormal pattern detector 906, a deep root cause analysis unit 907, a topology and transaction tracking unit 908, and a multivariate correlation analysis unit 909. The abnormal pattern detector 906, the topology and transaction tracking unit 908, and the multivariate correlation analysis unit 909 may perform abnormal pattern detection, topology and transaction data processing, and correlation analysis, respectively, as described above. The system under management 905 may be the distributed computing environment system illustrated, for example, in FIG. 2. Data from the abnormal pattern detector 906, the topology and transaction tracking unit 908, and the multivariate correlation analysis unit 909 may be combined 910, and may be provided to the path builder 902. The recommendation analyzer 903 may output a recommendation list to an operator 904.

According to an exemplary embodiment of the present invention, the path builder 902 may communicate with the information cube 901. The information cube 901 may store analytic and monitoring solutions. For example, the information cube 901 may store executable software for analysis and monitoring of the distributed computing environment, and the executable software may be utilized by the path builder 902. The monitoring and analysis solutions in the information cube 901 may capture workload and bottleneck dynamics of the components of the application including the distributed computing environment. Workload variations and an occurrence of bottlenecks in the application components may occur dynamically, and solutions for analyzing and monitoring the workload and bottlenecks may be learned and stored in the information cube 901. For example, predictive insight (PI) of the multivariate correlation analysis unit 909 may be increased by learning relationships between the application components and the timing of communication between the application components.

The recommendation analyzer 903 may generate a recommendation list (see, e.g., FIG. 17) based on data generated by traversing the graph built by the path builder 902 and may provide the recommendation list to an operator 904. The recommendation analyzer 903 may further analyze the recommendation list and present a prioritized recommendation list the user 904. For example, nodes which are identified as most likely abnormal may be presented to the user first by the recommendation analyzer 903. Abnormal or potentially abnormal nodes appearing on the recommendation list may be identified and/or prioritized based on confidence scores (see, e.g., FIG. 17).

The deep root cause analysis unit 907 may identify the root cause of performance degradation in the distributed computing environment. For example, the root cause of performance degradation may include a database deadlock, running out of JVM memory or running out of a database connection pool. Thus, an individual server may be identified as not functioning as desired. The root cause identified by the deep root cause analysis unit 707 may be correlated with the degradation of throughput and/or response time to determine causality in the edges between individual servers. The deep root cause analysis unit 707 may perform dynamic code path analytics. The deep root cause analysis unit 707 may determine a particular line of code which is causing degradation in a CPU or IO consumer. However, exemplary embodiments of the present invention are not limited thereto and any desired root cause analysis tools may be utilized, as desired.

The phrase "real system behavior" may refer to the average throughput and average response time that are measured for a particular application or system.

Figure 10:
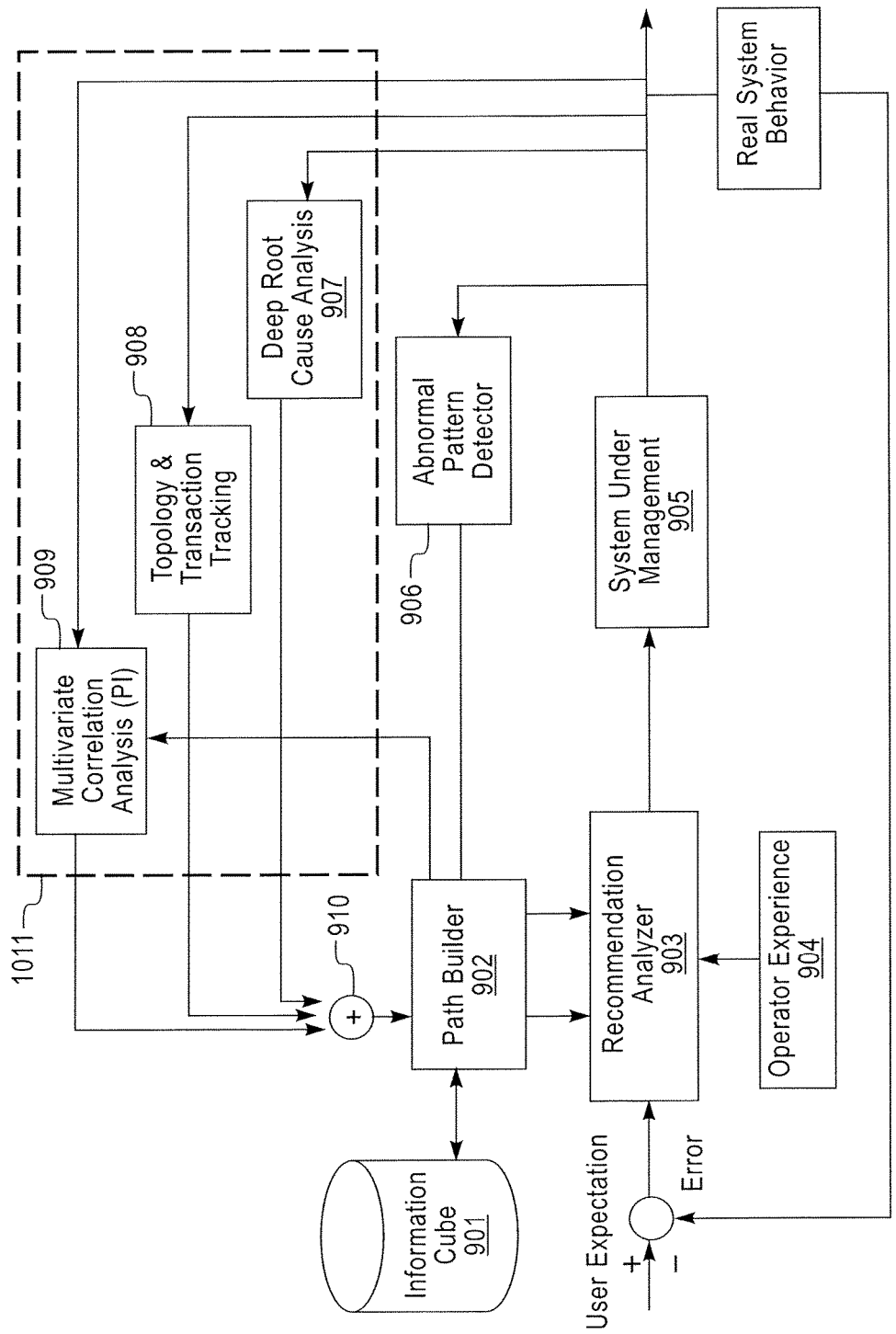
FIG. 10 is a schematic diagram illustrating system architecture including an analytic monitoring system according to an exemplary embodiment of the present invention.

FIG. 10 is a schematic diagram illustrating system architecture including an analytic monitoring system according to an exemplary embodiment of the present invention.

Referring to FIG. 10, an analytic monitoring system 1011 may include the multivariate correlation analysis unit 909, the topology and transaction tracking unit 908 and the deep root analysis unit 907. According to an exemplary embodiment of the present invention the presence of at least one abnormal application component may be detected by the analytic monitoring system 1011. The at least one abnormal application component may function as a system bottleneck.

FIGS. 11A-11D are graphs of exemplary response time data according to exemplary embodiments of the present invention.

Figure 11A:
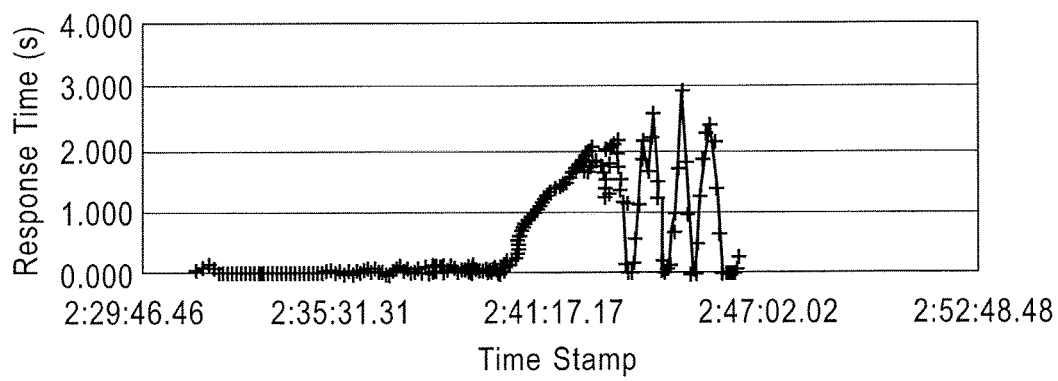
FIGS. 11A-D are graphs of exemplary response time data according to exemplary embodiments of the present invention.
Figure 11B:
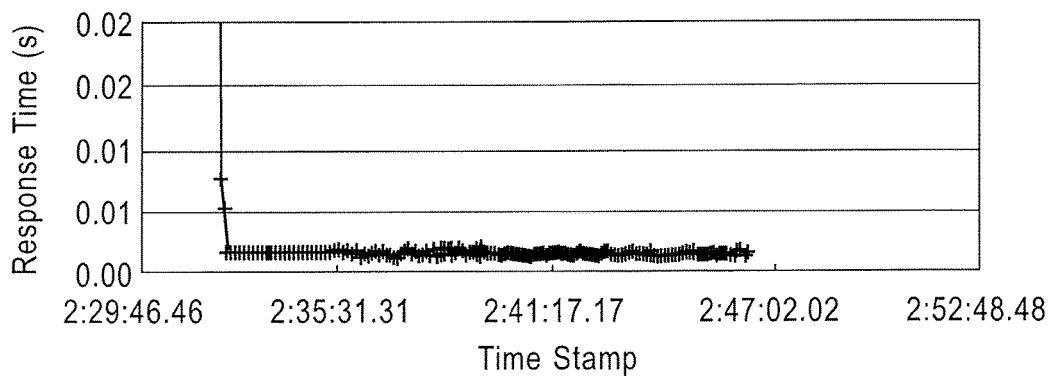
Figure 11C:
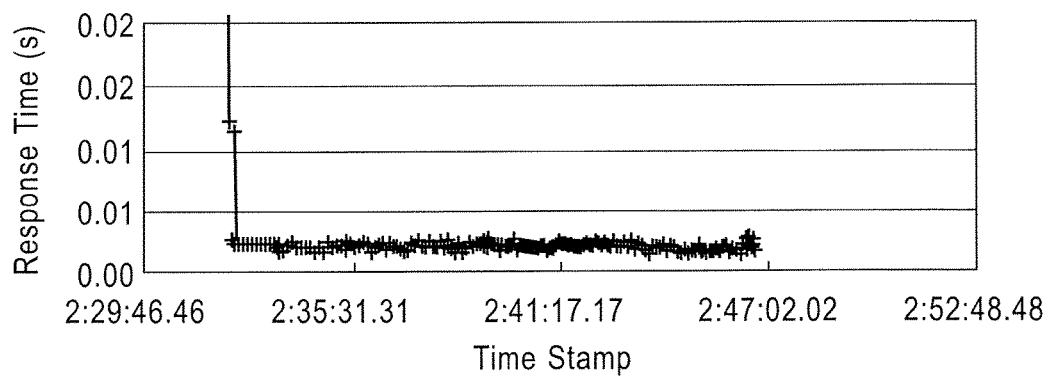
Figure 11D:
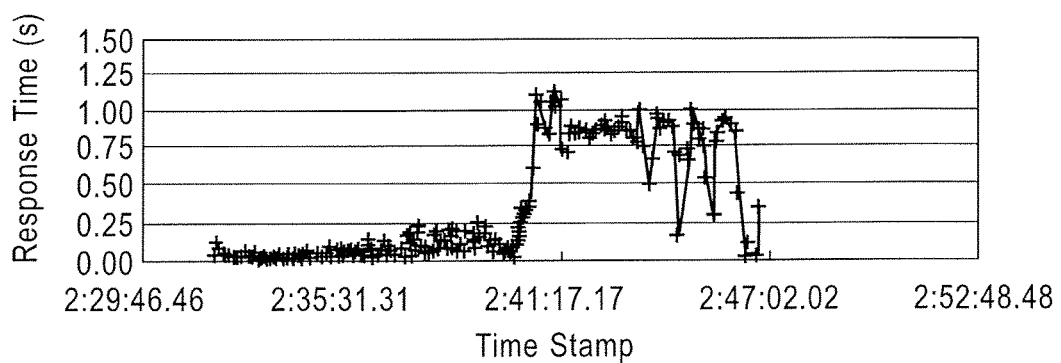

Referring to FIG. 11A, FIG. 11B, FIG. 11C and FIG. 11D, response times for exemplary nodes are illustrated. The response times are illustrated at a number of time stamps. As illustrated, a number of data points may be presented, and each data point may illustrate a response time determined for a particular node at each time point. As illustrated in FIG. 11A and FIG. 11D, a number of relatively long response times may be determined for a particular node. The relatively long response times may indicate an abnormality in the observed node. As illustrated in FIG. 11B and FIG. 11C, response times for a particular node may consistently be relatively short. The relatively short response times may indicate that there is not an abnormality in the observed node.

Figure 12:
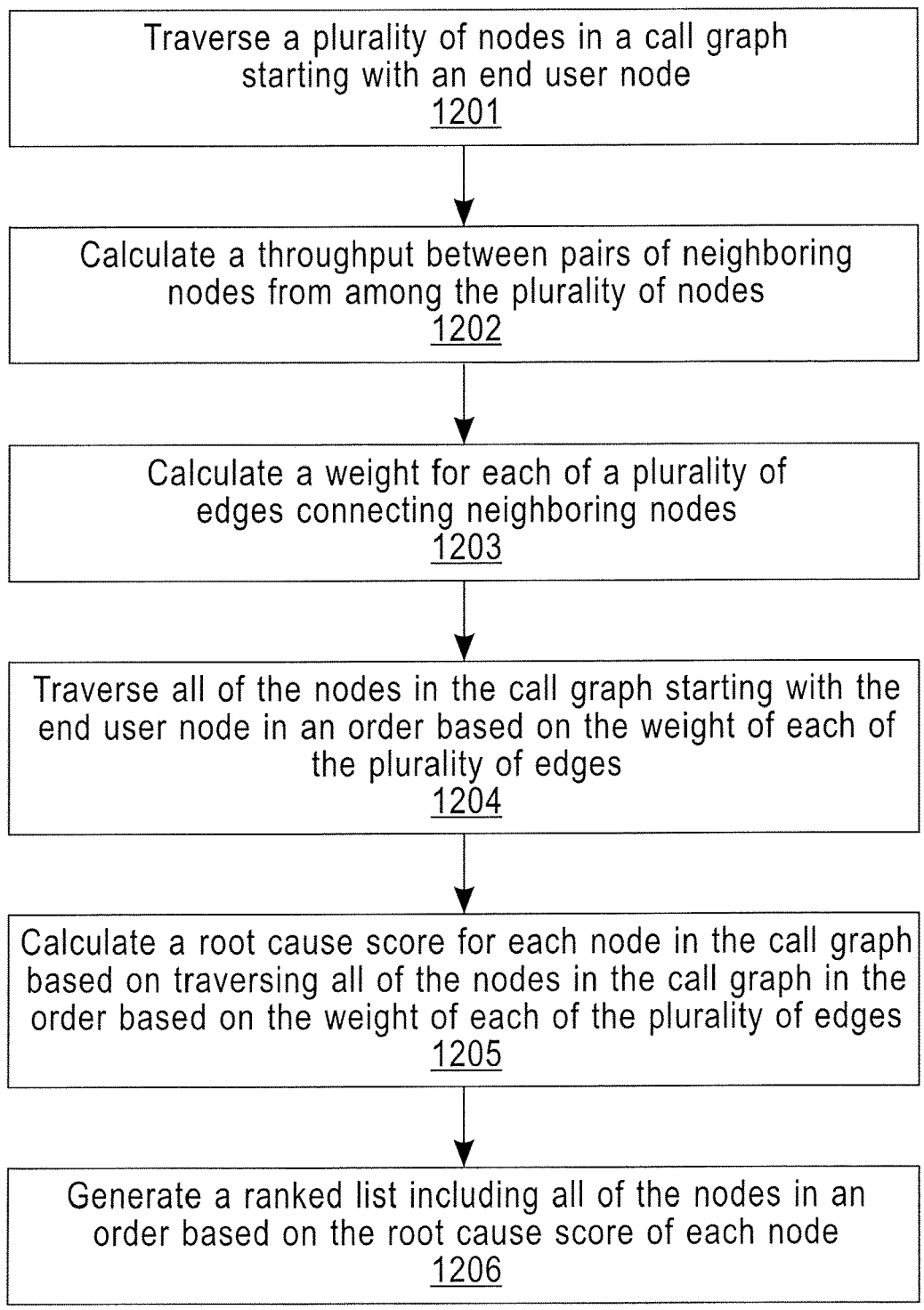
FIG. 12 is a flow chart of a method of relationship based root cause recommendation according to exemplary embodiments of the present invention.

FIG. 12 is a flow chart of a method of relationship based root cause recommendation according to exemplary embodiments of the present invention.

Exemplary embodiments of the present invention provide a method of identifying a root cause in a distributed computing environment. Referring to FIG. 12, the method of identifying a root cause in a distributed computing environment may include traversing a plurality of nodes in a call graph starting with an end user node 1201. Each node may correspond to an application component in the distributed computing environment. A throughput may be calculated between pairs of neighboring nodes from among the plurality of nodes 1202. The neighboring nodes in each pair may be connected to each other in the call graph. A weight may be calculated for each of a plurality of edges connecting the neighboring nodes in the pairs 1203. All of the nodes in the call graph may be traversed starting with the end user node in an order based on the weight of each of the plurality of edges 1204. A root cause score may be calculated for each node in the call graph based on traversing all of the nodes in the call graph in the order based on the weight of each of the plurality of edges 1205. A ranked list may be generated including all of the nodes in an order based on the root cause score of each node 1206. A node having a highest root cause score may be a first node in the ranked list and a node having a lowest root cause score may be a last node in the ranked list.

Figure 13:
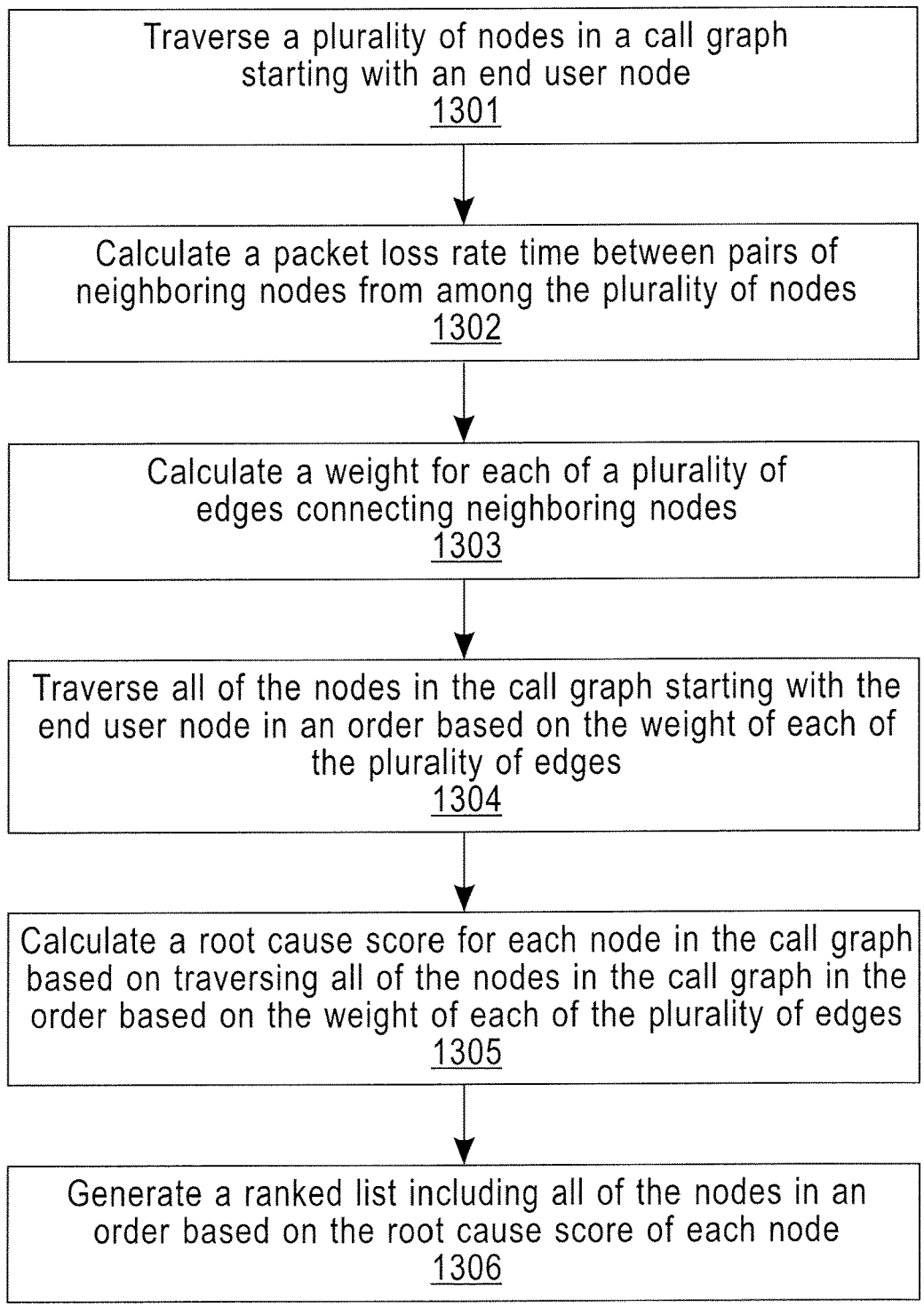
FIG. 13 is a flow chart of a method of relationship based root cause recommendation according to exemplary embodiments of the present invention.

FIG. 13 is a flow chart of a method of relationship based root cause recommendation according to exemplary embodiments of the present invention.

Exemplary embodiments of the present invention provide a method of identifying a root cause in a distributed computing environment. Referring to FIG. 13, the method of identifying a root cause in a distributed computing environment may include traversing a plurality of nodes in a call graph starting with an end user node 1301. Each node may correspond to an application component in the distributed computing environment. A packet loss rate may be calculated between pairs of neighboring nodes from among the plurality of nodes 1302. The neighboring nodes in each pair may be connected to each other in the call graph. A weight may be calculated for each of a plurality of edges connecting the neighboring nodes in the pairs 1303. All of the nodes in the call graph may be traversed starting with the end user node in an order based on the weight of each of the plurality of edges 1304. A root cause score may be calculated for each node in the call graph based on traversing all of the nodes in the call graph in the order based on the weight of each of the plurality of edges 1305. A ranked list may be generated including all of the nodes in an order based on the root cause score of each node 1306. A node having a highest root cause score may be a first node in the ranked list and a node having a lowest root cause score may be a last node in the ranked list.

Figure 14:
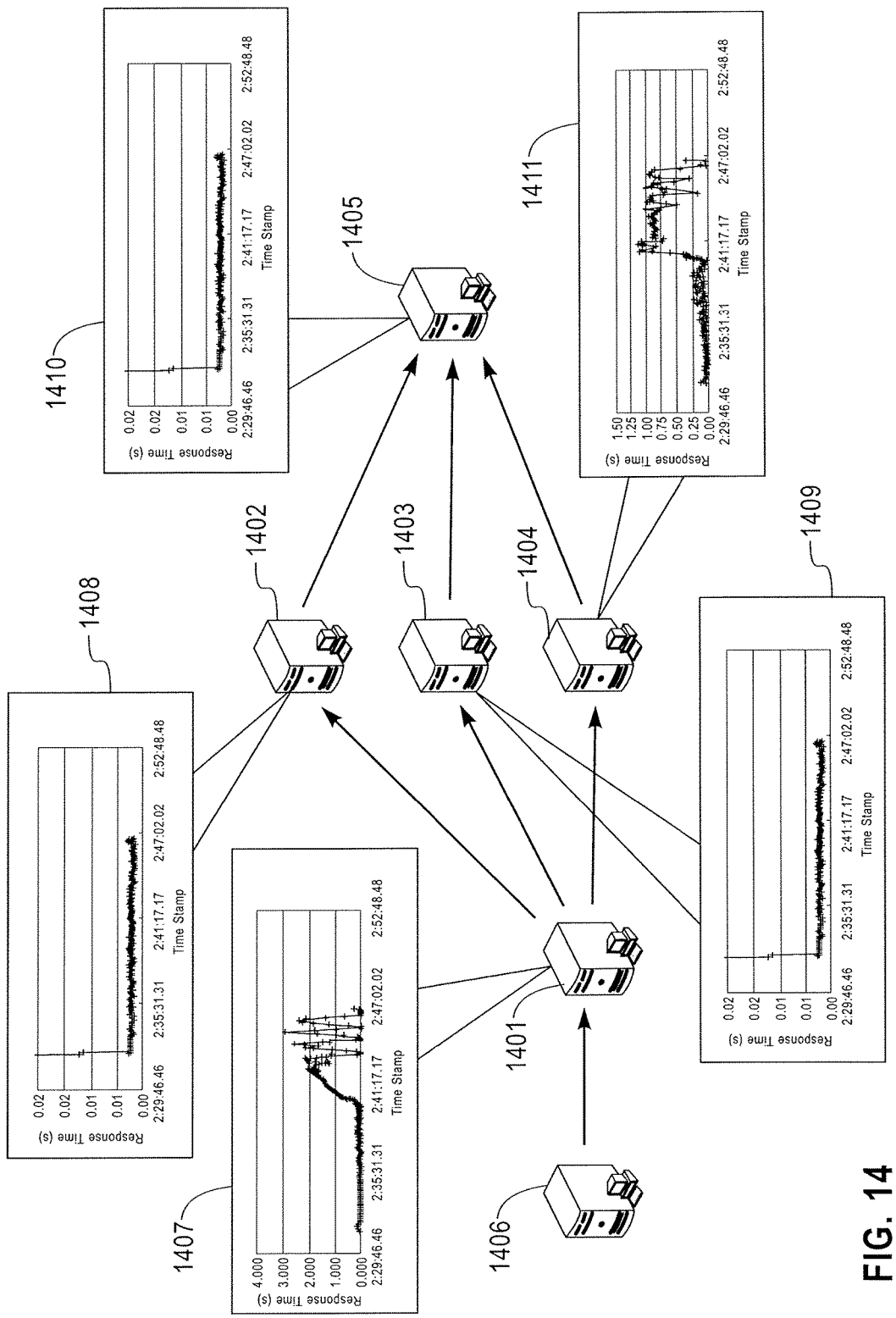
FIG. 14 illustrates exemplary response times for nodes in a distributed computing environment according to an exemplary embodiment of the present invention.
Figure 15:
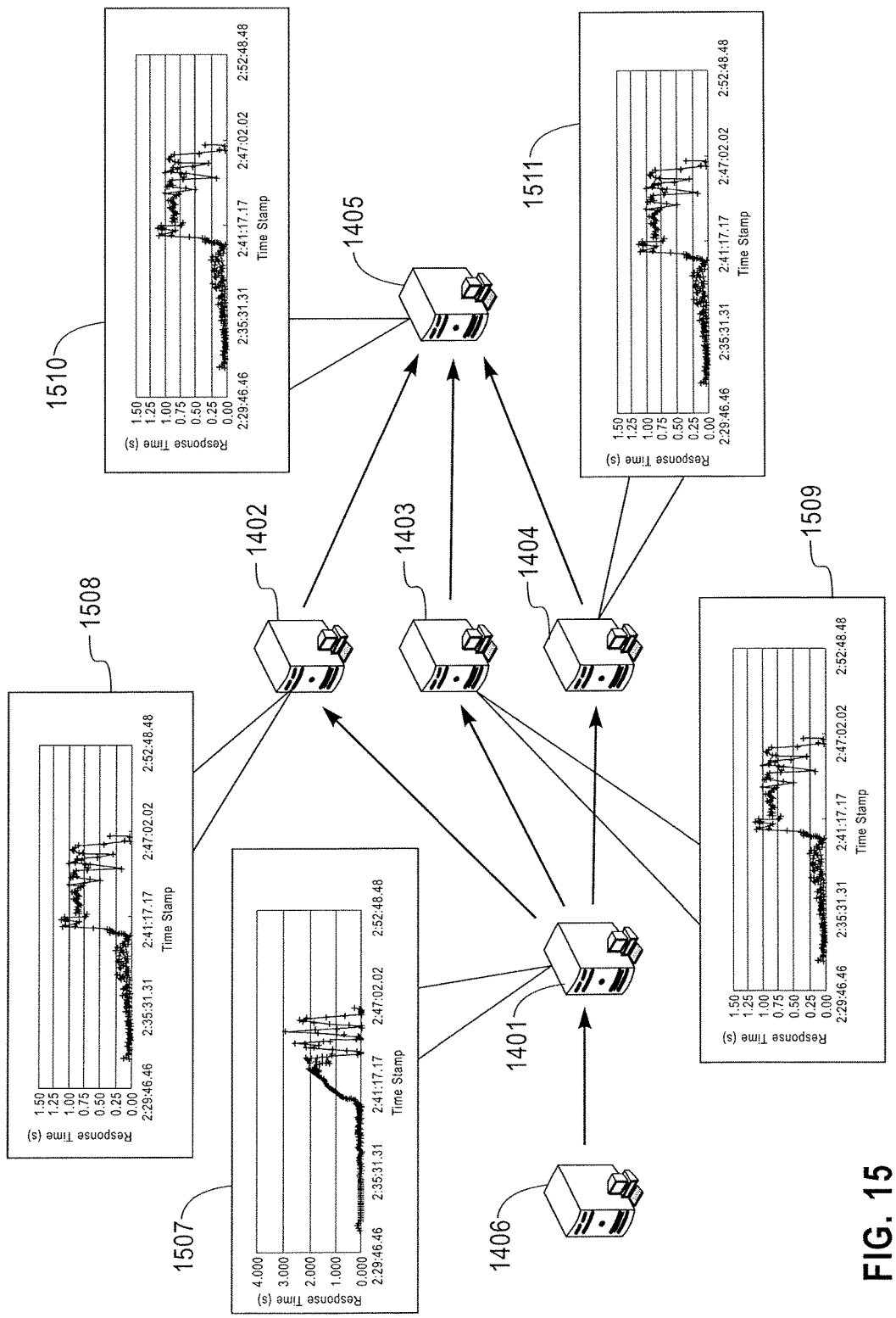
FIG. 15 illustrates exemplary response times for nodes in a distributed computing environment according to an exemplary embodiment of the present invention.

FIG. 14 illustrates exemplary response times for nodes in a distributed computing environment according to an exemplary embodiment of the present invention. FIG. 15 illustrates exemplary response times for nodes in a distributed computing environment according to an exemplary embodiment of the present invention.

Referring to FIGS. 14 and 15, a distributed computing environment may include a plurality of servers or computers (e.g., servers 1401, 1402, 1403, 1404, 1405 and 1406). The terms server and computer may be used interchangeably herein. Each server or computer in the distributed computing environment may be used to execute an application, such as a cloud application, and thus, each server or computer may be referred to as an application component. Each component of the application may be referred to as a node. For example, a graph of the plurality of servers (e.g., servers 1401, 1402, 1403, 1404, 1405 and 1406) may include a plurality of nodes, and each of the plurality of nodes may represent a server.

According to exemplary embodiments of the present invention, each of the plurality of servers (e.g., servers 1401, 1402, 1403, 1404, 1405 and 1406) may be linked with or may communicate with at least one other server. The links or connections between servers may be referred to as edges. A confidence score or weight may be calculated for each edge (as used herein, the terms confidence score and weight may be used interchangeably). The weight may be determined according to the response time detected in a particular edge compared with the end user response time or the response time for the entire application. The response times for each of the servers may be an indication of how likely a particular server contains an abnormality or is not functioning as desired.

For example, as illustrated in FIGS. 14 and 15, server 1401 may be linked with servers 1402, 1403, and 1404, while servers 1402, 1403 and 1404 may be linked with server 1405. Communication between each of the servers may be unidirectional or bidirectional, as desired. Response times may be determined for each of the servers 1401, 1402, 1403, 1404, 1405 and 1406. Response times may be detected for a plurality of time points and may be displayed as a graph for each of the servers of the application (e.g., response time graphs 1407, 1407, 1409, 1410, 1411, 1507, 1508, 1509, 1510, and 1511.

Figure 16:
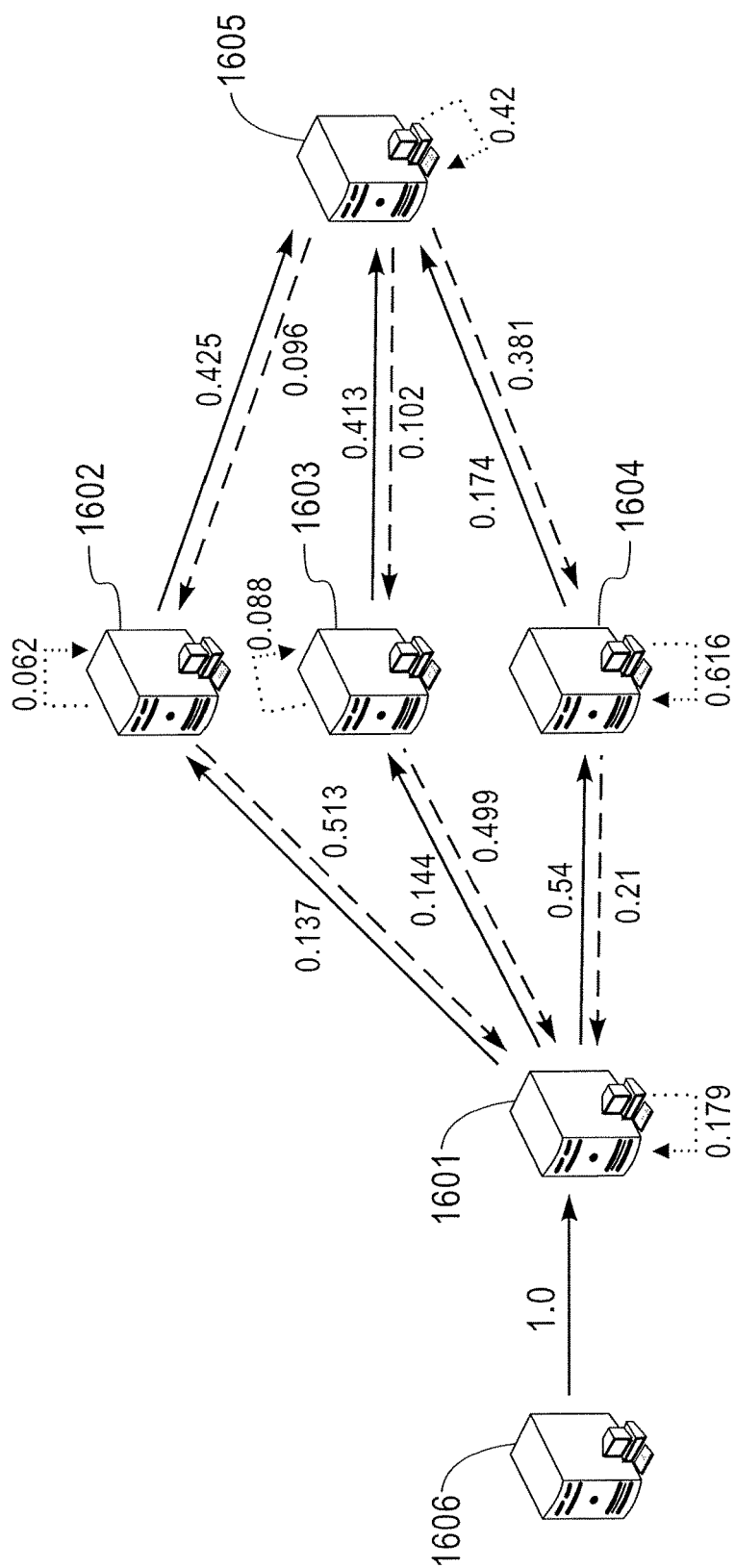
FIG. 16 illustrates exemplary root cause scores for exemplary nodes in a distributed computing environment and exemplary weights for exemplary edges in the distributed computing environment according to an exemplary embodiment of the present invention.

Similar abnormal patterns may be detected in two or more of the servers. For example, as illustrated in FIG. 15, similar abnormal patterns may be detected in servers 1508, 1509, 1510, and 1511. FIG. 16 illustrates exemplary root cause scores for exemplary nodes in a distributed computing environment and exemplary weights for exemplary edges in the distributed computing environment according to an exemplary embodiment of the present invention.

Referring to FIG. 16, a distributed computing environment may include a plurality of servers or computers (e.g., servers 1601, 1602, 1603, 1604, 1605 and 1606). According to exemplary embodiments of the present invention, each of the plurality of servers (e.g., servers 1601, 1602, 1603, 1604, 1605 and 1606) may be linked with or may communicate with at least one other server. The links or connections between servers may be referred to as edges. A confidence score or weight may be calculated for each edge. Communication between servers may be bidirectional, and weights may be determined in either direction of communication (e.g., between serve 1601 and downstream server 1602, or between server 1602 and downstream server 1601). The weight may be determined according to the response time, latency or a rate of occurrence of abnormal events detected in a particular edge compared with the end user response time or the response time for the entire application. The response time, latency or rate of occurrence of abnormal events for each of the servers may be an indication of how likely a particular server contains an abnormality or is not functioning as desired.

Root cause scores may be determined for each of the nodes. A higher root cause score may indicate a higher likelihood that a particular node includes an error. The root cause scores may be used to identify a potentially abnormal node and the recommendation list may be generated. For example, as illustrated in FIG. 16, node 1604 may have a relatively high root cause score and node 1604 may be included in the recommendation list. Thus, node 1704 may be targeted for repair or maintenance. Thus, bidirectional weights may be determined for each edge between each pair of neighboring serves, and the relative weights of each edge may be used to determine a root cause score for each server, node or component. The root cause score for each of the nodes may be used to calculate the confidence sores or weights for each of the edges. For example, the root cause score for each node may be applied as the confidence score for each of the nodes incoming edges, and each of the applied confidence scores may be normalized for the outgoing edges of each node to calculate the confidence scores or weights for each of the edges. That is, the weights determined for each of the edges may be a normalized relative value determined based on the relative confidence scores for each of the nodes.

Figure 17:
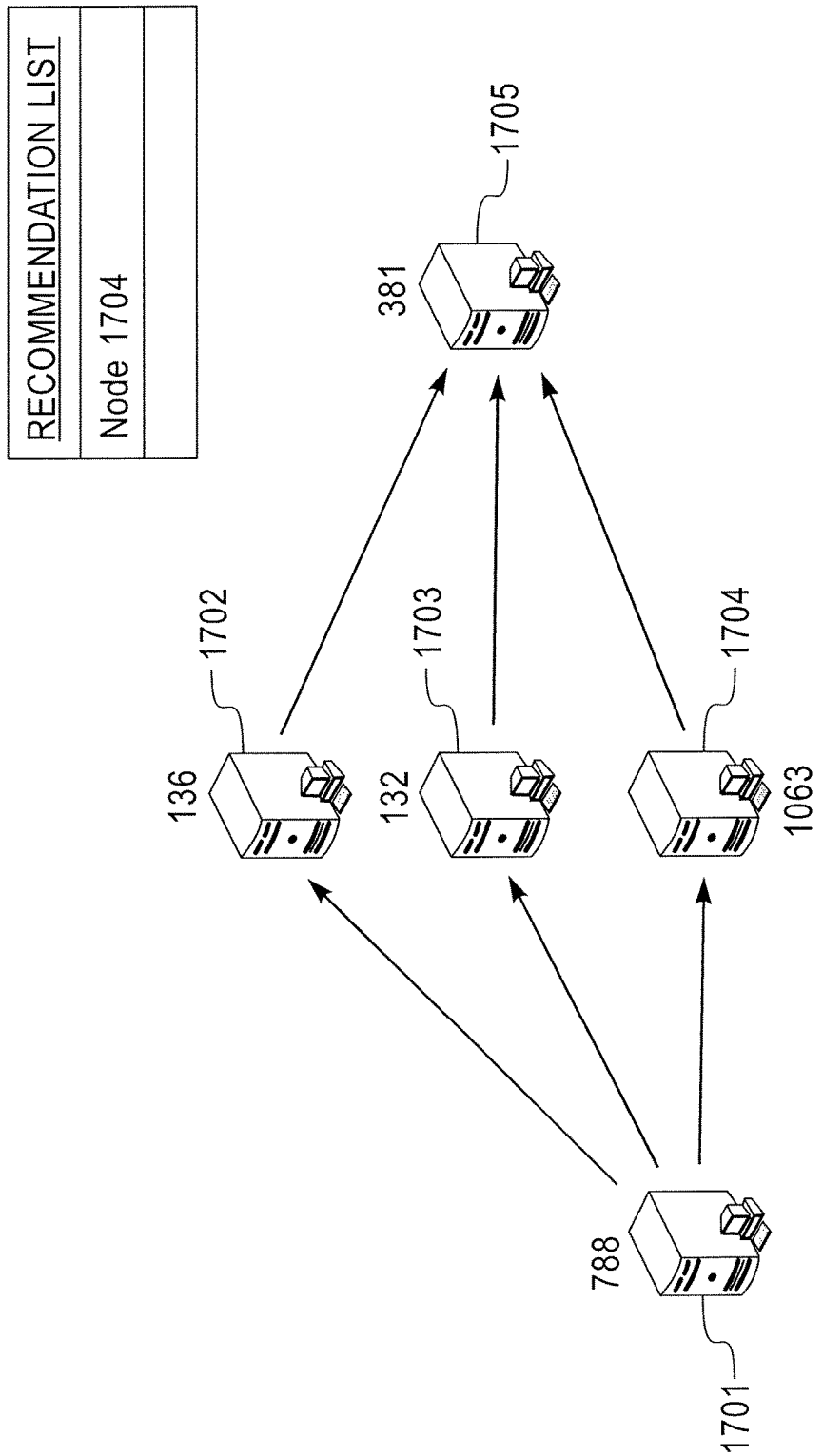
FIG. 17 illustrates exemplary root cause scores for a plurality of identified target nodes and an exemplary recommendation list corresponding to the plurality of identified target nodes according to exemplary embodiments of the present invention.

FIG. 17 illustrates exemplary root cause scores for a plurality of identified target nodes and an exemplary recommendation list corresponding to the plurality of identified target nodes according to exemplary embodiments of the present invention.

Referring to FIG. 17, the graph described in more detail above may be generated for the plurality of target nodes (e.g., nodes 1701, 1702, 1703, 1704 and 1705). Each of the target nodes may be traversed to identify response times, latency, throughput and/or error counts and root cause scores may be determined for each of the nodes. A higher root cause score may indicate a higher likelihood that a particular node includes an error. The root cause scores may be used to identify a potentially abnormal node and the recommendation list may be generated. The recommendation list may be ranked based on the relative root cause scores for each of the nodes. For example, as illustrated in FIG. 17, node 1704 may have a relatively high root cause score and node 1704 may be included in the recommendation list. Thus, node 1704 may be targeted for repair or maintenance.

According to an exemplary embodiment of the recommendation list may include the first node in the ranked list. The first node may be the root cause identified in the distributed computing environment. That is, the first node may have the higher confidence score or root cause score.

According to an exemplary embodiment of the present invention the first node in the ranked list may correspond to an application component that acts as a system bottleneck in the distributed computing environment.

Figure 18:
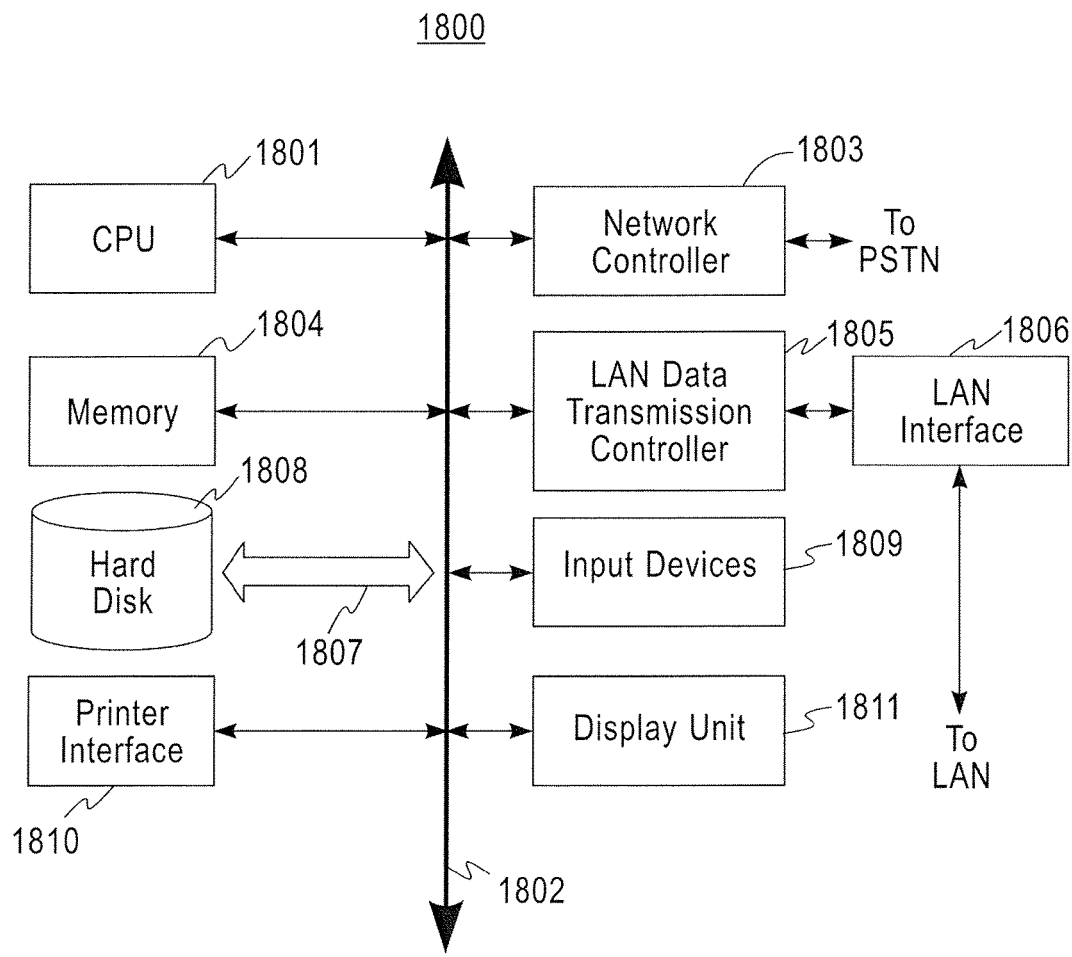
FIG. 18 illustrates an example of a computer system capable of implementing methods according to exemplary embodiments of the present invention.

FIG. 18 illustrates an example of a computer system capable of implementing the methods according to exemplary embodiments of the present invention. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1800 may include, for example, a central processing unit (CPU) 1801, random access memory (RAM) 1804, a printer interface 1810, a display unit 1811, a local area network (LAN) data transmission controller 1805, a LAN interface 1806, a network controller 1803, an internal bus 1802, and one or more input devices 1809, for example, a keyboard, mouse etc. As shown, the system 1800 may be connected to a data storage device, for example, a hard disk, 1808 via a link 1807.

The descriptions of the various exemplary embodiments of the present invention have been presented for purposes of illustration, but are not intended to be exhaustive or limited to the exemplary embodiments disclosed. Many modifications and variations will be apparent to those of ordinary skill in the art without departing from the scope and spirit of the described exemplary embodiments. The terminology used herein was chosen to best explain the principles of the exemplary embodiments, or to enable others of ordinary skill in the art to understand exemplary embodiments described herein.

The flowcharts and/or block diagrams in the figures illustrate the architecture, functionality, and operation of possible implementations of systems, methods, and computer program products according to various exemplary embodiments of the inventive concept. In this regard, each block in the flowchart or block diagrams may represent a module, segment, or portion of instructions, which comprises one or more executable instructions for implementing the specified logical function(s). In alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure relates to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of identifying a root cause in a distributed computing environment, comprising:
 generating a call graph including a plurality of nodes by merging topology relationship data, transaction tracking relationship data and metric correlation relationship data of the plurality of nodes, wherein the topology relationship data includes data regarding a physical distance between nodes of the plurality of nodes positioned in different geographic locations;

traversing the plurality of nodes in the call graph starting with an end user node, wherein each node corresponds to an application component in the distributed computing environment;

calculating a response time between pairs of neighboring nodes from among the plurality of nodes, wherein the neighboring nodes in each pair are connected to each other in the call graph;

calculating a weight for each of a plurality of edges connecting the neighboring nodes in the pairs based on the calculated response time between pairs of neighboring nodes among the plurality of nodes, wherein the weight of each edge is calculated based on a correlation between (i) the response time between the neighboring nodes in the corresponding pair and (ii) a response time between the neighboring node furthest from the end user node and the end user node;

traversing all of the nodes in the call graph starting with the end user node in an order based on the weight of each of the plurality of edges;

calculating a root cause score for each node in the call graph based on traversing all of the nodes in the call graph in the order based on the weight of each of the plurality of edges;

generating a ranked list comprising all of the nodes in an order based on the root cause score of each node; and generating a recommendation to repair at least one node of all of the nodes in the ranked list, wherein the at least one node corresponds to an application component that acts as a system bottleneck in the distributed computing environment.

2. The method of claim 1, wherein a node having a highest root cause score is a first node in the ranked list and a node having a lowest root cause score is a last node in the ranked list.

3. The method of claim 1, further comprising:
generating the recommendation comprising the first node in the ranked list, wherein the first node is the root cause identified in the distributed computing environment.

4. The method of claim 1, wherein the application components are computer servers.

5. The method of claim 1, wherein the order in which all of the nodes in the call graph are traversed is a highest weight to lowest weight order.

6. The method of claim 1, wherein the order in which all of the nodes in the call graph are traversed is a lowest weight to highest weight order.

7. The method of claim 1, further comprising:
detecting similar abnormal patterns that occur while traversing all of the nodes in the call graph starting with the end user node in the order based on the weight of each of the plurality of edges.

8. A method of identifying a root cause in a distributed computing environment, comprising:
generating a call graph including a plurality of nodes by merging topology relationship data, transaction tracking relationship data and metric correlation relationship data of the plurality of nodes, wherein the topology relationship data includes data regarding a physical distance between nodes of the plurality of nodes positioned in different geographic locations;

traversing the plurality of nodes in the call graph starting with an end user node, wherein each node corresponds to an application component in the distributed computing environment;

calculating a throughput between pairs of neighboring nodes from among the plurality of nodes, wherein the neighboring nodes in each pair are connected to each other in the call graph;

calculating a weight for each of a plurality of edges connecting the neighboring nodes in the pairs based on the throughput between pairs of neighboring nodes from among the plurality of nodes, wherein the weight of each edge is calculated based on a correlation between (i) the response time between the neighboring nodes in the corresponding pair and (ii) a response time between the neighboring node furthest from the end user node and the end user node;

traversing all of the nodes in the call graph starting with the end user node in an order based on the weight of each of the plurality of edges;

calculating a root cause score for each node in the call graph based on traversing all of the nodes in the call graph in the order based on the weight of each of the plurality of edges;

generating a ranked list comprising all of the nodes in an order based on the root cause score of each node; and generating a recommendation to repair at least one node of all of the nodes in the ranked list, wherein the at least one node corresponds to an application component that acts as a system bottleneck in the distributed computing environment.

9. The method of claim 8, wherein a node having a highest root cause score is a first node in the ranked list and a node having a lowest root cause score is a last node in the ranked list.

10. The method of claim 8, further comprising:
generating the recommendation comprising the first node in the ranked list, wherein the first node is the root cause identified in the distributed computing environment.

11. The method of claim 8, wherein the order in which all of the nodes in the call graph are traversed is a highest weight to lowest weight order.

12. The method of claim 8, wherein the order in which all of the nodes in the call graph are traversed is a lowest weight to highest weight order.

13. A method of identifying a root cause in a distributed computing environment, comprising:
generating a call graph including a plurality of nodes by merging topology relationship data, transaction tracking relationship data and metric correlation relationship data of the plurality of nodes, wherein the topology relationship data includes data regarding a physical distance between nodes of the plurality of nodes positioned in different geographic locations;

traversing the plurality of nodes in the call graph starting with an end user node, wherein each node corresponds to an application component in the distributed computing environment;

calculating a packet loss rate between pairs of neighboring nodes from among the plurality of nodes, wherein the neighboring nodes in each pair are connected to each other in the call graph;

calculating a weight for each of a plurality of edges connecting the neighboring nodes in the pairs based on the packet loss rate between pairs of neighboring nodes from among the plurality of nodes, wherein the weight of each edge is calculated based on a correlation between (i) the response time between the neighboring nodes in the corresponding pair and (ii) a response time between the neighboring node furthest from the end user node and the end user node;

traversing all of the nodes in the call graph starting with the end user node in an order based on the weight of each of the plurality of edges, wherein the order in which all of the nodes in the call graph are traversed is a highest weight to lowest weight order;

calculating a root cause score for each node in the call graph based on traversing all of the nodes in the call graph in the order based on the weight of each of the plurality of edges;

generating a ranked list comprising all of the nodes in an order based on the root cause score of each node, wherein a node having a highest root cause score is a first node in the ranked list and a node having a lowest root cause score is a last node in the ranked list; and generating a recommendation to repair at least one node of all of the nodes in the ranked list, wherein the at least one node corresponds to an application component that acts as a system bottleneck in the distributed computing environment.

14. The method of claim 13, further comprising:
generating a recommendation comprising the first node in the ranked list, wherein the first node is the root cause identified in the distributed computing environment.

15. The method of claim 1, wherein the nodes of the plurality of nodes positioned in different geographic locations represent servers located in different countries from each other.

* * * * *